(12) United States Patent
Zhou

(10) Patent No.: US 12,051,875 B2
(45) Date of Patent: Jul. 30, 2024

(54) UNLOCKING STRUCTURE AND OPERATING METHOD FOR PLUGGABLE MODULES

(71) Applicant: Dan Zhou, Wuhan (CN)

(72) Inventor: Dan Zhou, Wuhan (CN)

( * ) Notice: Subject to any disclaimer, the term of this patent is extended or adjusted under 35 U.S.C. 154(b) by 340 days.

(21) Appl. No.: 17/639,332

(22) PCT Filed: Aug. 27, 2020

(86) PCT No.: PCT/CN2020/111538
§ 371 (c)(1),
(2) Date: Feb. 28, 2022

(87) PCT Pub. No.: WO2021/037089
PCT Pub. Date: Mar. 4, 2021

(65) Prior Publication Data
US 2022/0302645 A1    Sep. 22, 2022

(30) Foreign Application Priority Data

Aug. 28, 2019 (CN) .......................... 201910802625.2

(51) Int. Cl.
*H01R 13/629*    (2006.01)
*G02B 6/42*    (2006.01)
*H01R 13/514*    (2006.01)

(52) U.S. Cl.
CPC ..... *H01R 13/62961* (2013.01); *H01R 13/514* (2013.01); *H01R 13/62955* (2013.01); *G02B 6/4261* (2013.01)

(58) Field of Classification Search
CPC .. H01R 13/514; H01R 13/516; H01R 13/518; H01R 13/62933; H01R 13/62955; H01R 13/62961; H01R 13/62966; H01R 13/62972; G02B 6/426; G02B 6/4261
USPC ......................................................... 439/894
See application file for complete search history.

(56) References Cited

U.S. PATENT DOCUMENTS

| | | |
|---|---|---|
| 9,739,953 B2 | 8/2017 | Moriyama |
| 9,929,500 B1 | 3/2018 | Ista |
| 2004/0062493 A1 | 4/2004 | Ishigami |
| 2004/0219819 A1 | 11/2004 | Di Mascio |

FOREIGN PATENT DOCUMENTS

| | | |
|---|---|---|
| CN | 102346282 A | 2/2012 |
| CN | 106159564 A | 11/2016 |
| CN | 107015321 A | 8/2017 |
| CN | 107438783 A | 12/2017 |

(Continued)

*Primary Examiner* — Khiem M Nguyen

(57) ABSTRACT

An unlocking structure for a pluggable module (1XA) which mainly comprises a push/pull handle (11A), an unlocking plate (12), a casing (13, 14), and a part incorporating a motion block piece (15X). Pushing the push/pull handle (11A) moves the unlocking plate (12) toward the rear end of the casing (13, 14) to unlock the module, and then pulling the push/pull handle (11A) allows the module to be removed; in the unlocked state, the unlocking plate (12) can be reset by means of rotating the push/pull handle (11A). This unlock and reset operation provides a complete operation mechanism for the module, as not only is it able to plug in and unplug the module with cable attached, but also able to conveniently operate a reset in situ, while maximally avoiding misoperations and accidents, and the related operations being simple and easy.

20 Claims, 18 Drawing Sheets

(56) References Cited

FOREIGN PATENT DOCUMENTS

| | | | |
|---|---|---|---|
| CN | 108802917 | A | 11/2018 |
| CN | 108802920 | A | 11/2018 |
| CN | 109633838 | A | 4/2019 |
| CN | 109683259 | A | 4/2019 |
| CN | 109904657 | A | 6/2019 |
| CN | 209231576 | U | 8/2019 |
| CN | 110556670 | A | 12/2019 |
| CN | 110632712 | A | 12/2019 |
| JP | 2017111421 | A | 6/2017 |

UNLOCKING STRUCTURE AND OPERATING METHOD FOR PLUGGABLE MODULES

CROSS-REFERENCE TO RELATED APPLICATIONS

This application is a U.S. National Stage of International Application No. PCT/CN2020/111538, filed Aug. 27, 2020, titled UNLOCKING STRUCTURE AND OPERATING METHOD FOR PLUGGABLE MODULE, which claims priority to Chinese Patent Application No. 201910802625.2, filed Aug. 28, 2019. Both of the foregoing applications are incorporated herein by reference in their entireties.

TECHNICAL FIELD

This invention relates to an unlocking structure and an associated operating method for electronic or optoelectronic modules in the field of communications.

BACKGROUND

The ports of a communication equipment to send signals to and receive signals from the external lines, such as electrical cables or optical cables, are generally formed by pluggable electronic or optoelectronic modules. These modules are, at any time, readily mounted into or unmounted from the mounting slots, or called mounting cages, of the equipment's communicating units in the way of direct plugging in and unplugging. The end of the module which is plugged into, to be called the rear end, establishes the contact connections with the interior electrical interface of the communication equipment; the other end of the module, called the front end, forms the communication port of the equipment on its panel, which is to connect to various kinds of electrical or optical cables that are with relevant, standardized connectors, or, the cables connection on a module is of a permanent nature, where cables are to be removed together with the modules.

With regard to the mounting and unmounting of the pluggable module in the communication equipment, a key issue is that not only should a stable connection between the dense electrical interfaces of the module mounted and the equipment be guaranteed, as to prevent signal loss or line failure due to dislocations or accidental removal of the module under work, but also, apart from that, the module shall be conveniently removed from the equipment whenever it's so needed. This is called the locking and unlocking issue of the pluggable modules.

Regarding the locking of the pluggable modules, the basic ways of locking are agreed upon within the industry as represented by associated protocols and standards, as to maintain product compatibilities between modules and equipments. FIG. 1 shows, with respect to a type of pluggable module 1' which is among the main kinds, its basic way of locking in a mounting cage 2 of an equipment, as defined in the industry and in the related protocols and standards. In this locking, an inwardly bent leaf spring 21 facing toward the rear of the mounting cage 2 is provided on each side of the mounting cage 2, whereas the casing of the pluggable module 1', at its both sides, provides a kind of locking step surface structure facing toward the cage leaf spring 21, such as the locking step surface 1711' illustrated in FIG. 1. When the module 1' is inserted into the mounting cage 2, upon arrival of the module locking step surface 1711' at the cage leaf spring 21 position, the leaf spring 21 gets loose downward and butts against the locking step surface 1711', by which the locking of the module 1' in the mounting cage 2 is formed. This locking position also corresponds to the innermost position that the module 1' is inserted to in the mounting cage 2. At this stage, the module can no longer move back or get pulled out, thus the steady interface connection between the module and the equipment is realized.

The above defined basic way of the locking, determines the basic way of the unlocking for the module 1': it is to render the module 1' on its own a certain operation mechanism such that when it needs to be removed, the mechanism can apply and raise up the mentioned leaf springs 21 on both sides of the mounting cage 2, separating the leaf springs 21 from the locking step surfaces 1711' such as of FIG. 1 on both sides of the module 1', after which the locking to the module is released and the module can be pulled out. Among the prior unlocking mechanisms utilized in the modules of this field in the industry, with respect to the said type of pluggable module 1', a movable bulge structure with a defined ramp surface is usually adopted, as the unlocking bulge 1211' shown in FIG. 1, whose unlocking operation mechanism is: to make the unlocking bulge 1211' on the module 1' move toward the leaf spring 21 under a given unlocking operation so as to raise the leaf spring 21 up by its ramp surface, obtaining the unlocking of the module 1'.

Under the basic way of unlocking described above, the unlocking operation mechanisms already utilized in the industry are divided into two fundamental types: one is the rotation bail type, where the bail is fixed onto the front end of the module and can rotate about the fixing position, and this rotation, through mechanical linkage, turns to the drive that leads an unlocking element on the sides of the casing into back and forth movements with the unlocking bulge 1211' set at the end, thus realizing the above unlocking, plus resetting, typical structure of which being shown in a representative patent U.S. Pat. No. 9,146,366B2; the other is the direct-pull type, where its unlocking element on the sides of the module with the unlocking bulge 1211' at its end is driven toward the leaf spring 21 by direct outward pulling of a flat bail in the horizontal direction, realizing the unlocking while at the same moment pulling the module out, after which a spring mechanism arranged in the module renders the unlocking element backward, i.e., the reset, in an automatic way, typical structure of which being shown in a representative patent CN201310114326.2.

A most hindering issue of the rotation bail in its applications is the inability to perform the module plug-in and unplug with the cable attached: under this form, the cable connected to the module needs to be removed beforehand, otherwise the bail's unlocking operation by the rotation can not be applied due to the obstacle of the cable. This is rather inconvenient to plug and unplug implementations of the module, whereas for the sorts of the permanent, pigtailed connection types, such as the active optical cable, this form of operation can not be applied at all. As for the direct-pull, a defect is present that lies in the deficiency in its control of the unlocking status: due to that the module unlocking and pull-out are the same operation as pulling the bail outwardly, therefore no matter whether it is really needed or not in pulling the module out, the signal goes off because of the module dislocation that has already taken place under the module unlocking operation. This defect in the operation mechanism renders the direct-pull vulnerable as inducing possible misoperations in its implementation, such as unintentional engagements with the bail, or mistakenly unlocking a wrong line while it's too late, both of which result in a line failure. At the same time, the direct-pull is also hard to realize in-situ resetting, i.e., to recover the module from the unlocked status back to the locked status when the module has not been pulled out after its unlocking operation, during which the line is not affected. The root reason of these issues of the direct-pull hence lies in its lack of relevant control of the unlocked status and the procedure. As for the rotation bail, due to that the cables need to be removed first before the unlocking, the aforementioned rotation bail type naturally does not possess an in-situ reset function.

Invention Contents

This invention provides an unlocking structure and an operating method for pluggable modules, aiming firstly at resolving the issue present in the rotation bait type where modules can't be plugged and unplugged with cable attached, by providing a solution that comes to be universally adaptable in the unlocking and resetting operating methods, then at the same time, with regard to the direct-pull present, considering make-ups in addressing its insufficiency in the unlock status and procedure control, by completing the module unlock and reset operation, so as to reduce the possibility of various misoperations to a minimum, as well as realizing a same easy and simple operation.

For the above purpose, the solution in this invention is as follows:

An unlocking structure for unlocking pluggable modules locked by mounting cages with cages' engagement springs, comprising:

a casing; an unlocking plate set onto the casing to slide along the casing in the casing's longitudinal direction, wherein the unlocking plate can complete module unlocking once the unlocking plate slides to a designated position, the unlocking plate including a detention edge; and a motion block piece set between the unlocking plate and the casing, wherein the motion block piece can move in a transverse direction in relation to the casing, or in a direction containing the transverse direction, the motion block piece including a detention bulge;

wherein when the unlocking plate slides to the designated position and completes module unlocking, the detention edge of the unlocking plate is locked by the detention bulge.

Said unlocking structure, wherein the motion block piece includes a reset bulge, wherein the detention bulge moves in pace with the reset bulge once the reset bulge is under drive by a force.

Said unlocking structure, further comprising a push/pull handle that is rotatably connected to the unlocking plate through a rotation connection and can push and pull the unlocking plate to slide along the casing in the casing's longitudinal direction, the push/pull handle including a resetting edge, wherein when the push/pull handle drives the unlocking plate to the designated position to carry out module unlocking, the resetting edge gets close to the reset bulge of the motion block piece;

wherein the reset bulge includes a slop surface such that when the resetting edge gets close to the reset bulge, and the push/pull handle is rotated, the resetting edge can slide upon the slop surface and drive back the motion block piece toward the inner side of the casing, so that the detention bulge is separated away from the detention edge of the unlocking plate.

Said unlocking structure, wherein the detention bulge and the reset bulge belong to different lateral heights of a same bulge, wherein the detention bulge becomes the detention section and the reset bulge becomes the reset section, the detention section being closer to the casing as compared to the reset section; and wherein a detention-yield recess is set in conjunction with the resetting edge on the push/pull handle, wherein the detention-yield recess corresponds to and cooperates with the detention section, and the resetting edge corresponds to and cooperates with the reset section.

Said unlocking structure, in which the motion block piece is a rotation block piece, wherein the rotation block piece is rotatably connected to the casing through a fix for rotation in such a way that the rotation block piece fluctuates up and down the casing surface when the rotation block piece rotates about the fix.

Said unlocking structure, in which the motion block piece is a rotation block piece, wherein the rotation block piece is rotatably connected to the casing through a fix for rotation in such a way that the rotation block piece fluctuates up and down the casing surface when the rotation block piece rotates about the fix, wherein the detention bulge and the reset bulge are separated along the rotation's axial direction.

Said unlocking structure, wherein the unlocking plate includes a semi-closed rotation yield hole and the push/pull handle includes a limiting rod, wherein the limiting rod can slide within the semi-closed rotation yield hole and when the limiting rod is at the innermost position of the semi-closed rotation yield hole, the push/pull handle is at the longitudinal horizontal status.

Said unlocking structure, wherein a first limiting bump is set at the joint position where the border of the semi-closed rotation yield hole meets the profile edge of the unlocking plate such that when the push/pull handle rotates and the limiting rod passes over the first limiting bump, the limiting rod can be limited by the first limiting bump so that the push/pull handle can be kept at this position.

Said unlocking structure, wherein a second limiting bump is set on the casing such that the second limiting bump can adjoin the limiting rod when the limiting rod is positioned at the innermost of the semi-closed rotation yield hole, where the second limiting bump can limit an unintentional jumping or jittering of the limiting rod.

Said unlocking structure, in which the unlocking plate includes a reset-pass opening, wherein when the unlocking plate slides to the designated position and completes module unlocking, the reset bulge can pass through the reset-pass opening of the unlocking plate.

Said unlocking structure, wherein the longitudinal length of the reset-pass opening matches the longitudinal sliding distance of the unlocking plate such that the reset bulge can always pass through the reset-pass opening during the unlocking plate's sliding along the casing's longitudinal direction to the designated position.

Said unlocking structure, wherein the unlocking plate includes an auxiliary control opening in parallel with the reset-pass opening and the motion block piece includes an auxiliary control bulge, wherein only when the unlocking plate slides, along the casing's longitudinal direction, to the designated position and completes module unlocking, can the auxiliary control bulge pass through the auxiliary control opening of the unlocking plate.

Said unlocking structure, further comprising a motion block spring that is set between the motion block piece and the casing, where the motion block spring is normally under compressed status.

Said unlocking structure, further comprising a return spring set between the unlocking plate and the casing along the longitudinal orientation; wherein the unlocking plate includes a bent structure and the casing includes a first combined recess along the casing's longitudinal direction, wherein a horizontal longitudinal accommodation recess to receive both the bent structure and the return spring is set within the first combined recess, wherein one end of the return spring is to contact with the bent structure, the other to butt against one longitudinal end of the horizontal longitudinal accommodation recess, and the other longitudinal end of the horizontal longitudinal accommodation recess is a defined stop limit to butt against the bent structure of the unlocking plate in order to decide the ultimate position of the unlocking plate when the unlocking plate returns from the designated position along the casing's longitudinal direction.

Said unlocking structure, wherein the first combined recess includes a vertical mounting groove for a passing of the bent structure of the unlocking plate, wherein one end of the vertical mounting groove is open, the other connects to the horizontal longitudinal accommodation recess; and wherein the unlocking plate includes a return spring mounting opening by a side of the bent structure along the longitudinal direction, wherein the return spring mounting opening corresponds to the position of the horizontal longitudinal accommodation recess in order to mount the return spring.

Said unlocking structure, wherein a locking step surface is set at the rear end of the first combined recess, wherein the locking step surface is to work with the cage engagement spring and is the designated position; and wherein the unlocking plate includes an unlocking arm in the longitudinal direction, wherein the unlocking arm can slide backward along the longitudinal direction in the first combined recess, wherein the unlocking arm includes an unlocking edge at the rear end of the unlocking arm so that the unlocking edge is to get contact with the locking step surface thus to carry out module unlocking.

Said unlocking structure, wherein an upper step surface and a lower step surface with coplanarity are set in the first combined recess along the upper and lower edge regions of the unlocking arm in the longitudinal length direction; and wherein a slope surface is set close to the locking step surface in the first combined recess.

A method of unlocking pluggable modules locked by mounting cages, comprising:

setting an unlocking plate onto a casing of a module such that the unlocking plate can slide along the casing in the casing's longitudinal direction, wherein the unlocking plate includes a detention edge;

preparing a motion block piece with a detention bulge and setting the motion block piece between the unlocking plate and the casing such that when the unlocking plate slides backward along the casing in the casing's longitudinal direction and arrives at a designated position, the motion block piece will move protrudingly toward the outer side of the casing and have the detention edge of the unlocking plate locked by the detention bulge;

driving the unlocking plate to slide backward along the casing in the casing's longitudinal direction to the designated position to get the module unlocked; and dragging the unlocking plate back forward to remove the module.

Said method of unlocking pluggable modules, further comprising adding a reset bulge to the motion block piece, wherein the reset bulge includes a slop surface;

preparing a push/pull handle such that the push/pull handle is connected to and can rotate in relation to the unlocking plate, wherein the push/pull handle includes a resetting edge such that when the unlocking plate gets the module unlocked the resetting edge is close to the reset bulge; and rotating the push/pull handle so that the resetting edge slides upon the slop surface of the reset bulge and drives back the motion block piece toward the inner side of the casing, so that the detention bulge is separated away from the detention edge of the unlocking plate.

Said method of unlocking pluggable modules, further comprising setting a return spring between the unlocking plate and the casing along the casing's longitudinal orientation such that when the detention bulge is separated away from the detention edge of the unlocking plate the return spring drives the unlocking plate back forward and resets the module.

Advantages of the invention: The pluggable modules' unlocking structure and operating method of this invention provide a kind of complete operation mechanism for the module unlock and reset, where not only is the handling with cable attached obtained, but also it's convenient to realize in-situ resetting, with maximum avoidance of misoperations and accidents, while being with easy and simple operations. Meanwhile, for pluggable modules of the unlocking structure of this invention, the assembling process is simple and fast, the assembled is firm and stable, with no hidden issue, and no special or particular tools are in need, whereas the parts repair and change are easy as well, which gives good operability in implementations.

DETAILED DESCRIPTION

Figure 1:
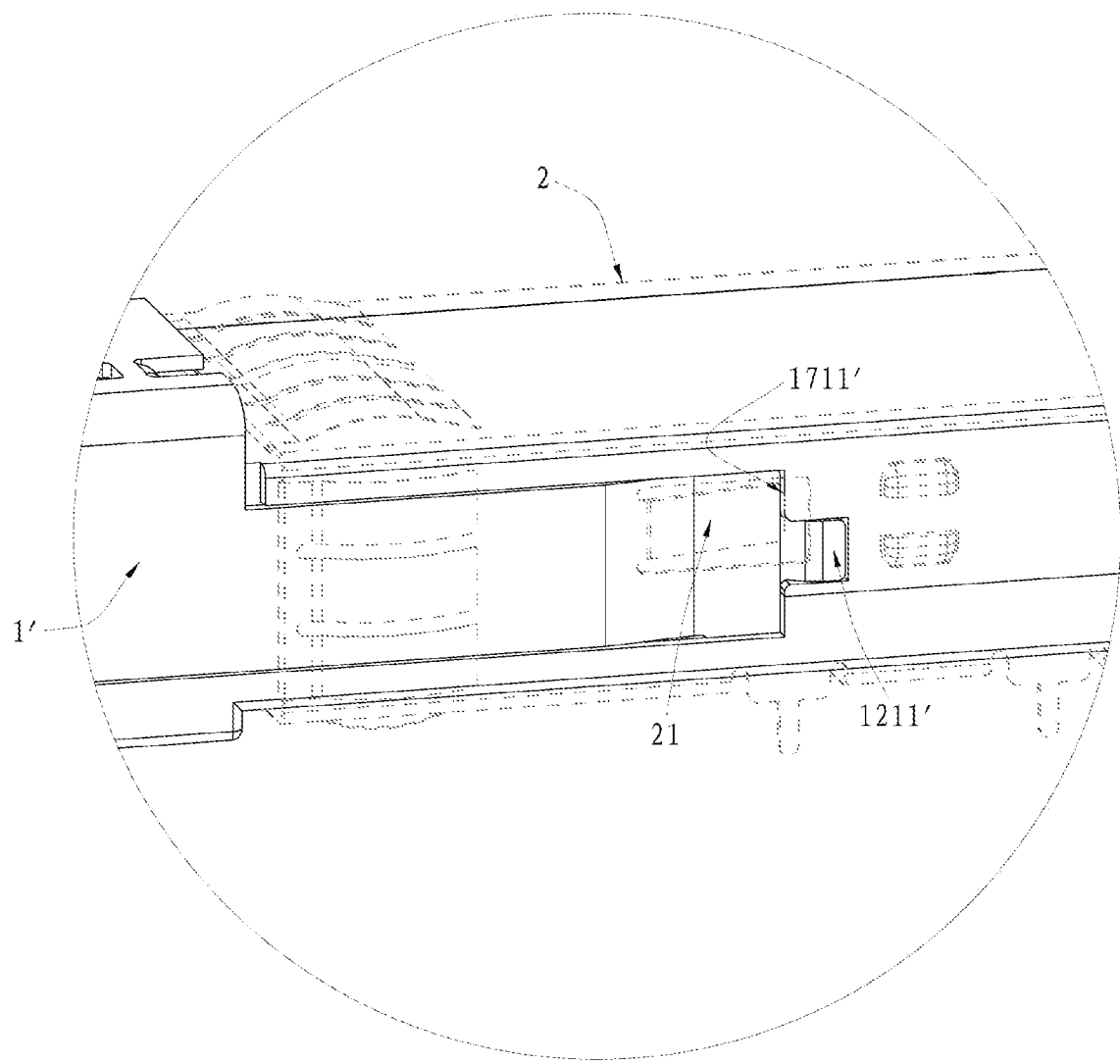
FIG. 1 is a perspective view showing a basic way of module locking defined in the industry and a regular unlocking end structure for it under the prior art.

With reference to the drawings, some specific embodiments of the invention are described below in details, the disclosure of which is for the purpose of illustration and not of the nature of limitation. The same reference signs in the drawings refer to the same or alike elements or parts. These drawings are to be interpreted as illustrative and thus may not be drawn in scale.

Figure 2A:
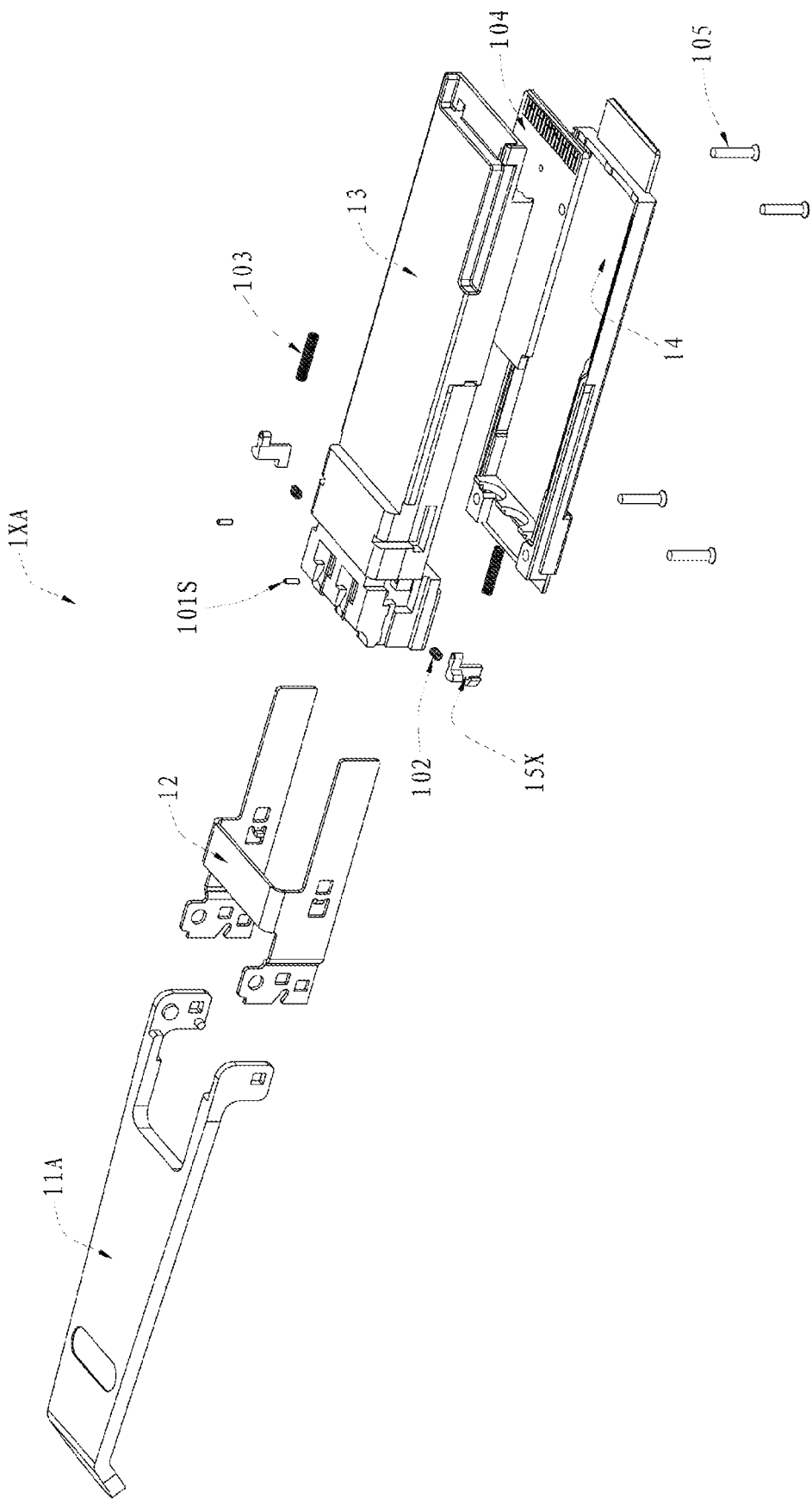
FIG. 2A is an exploded perspective view of an example pluggable module of this disclosure.
Figure 2B:
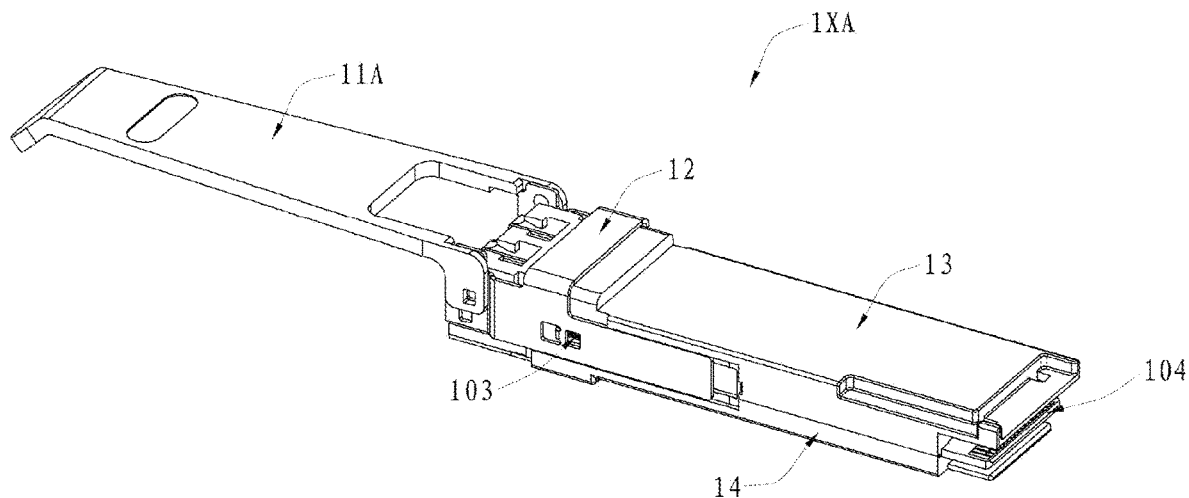
FIG. 2B is a perspective view of the integrate appearance of the pluggable module of FIG. 2A.

One embodiment of the invention is shown in FIGS. 2A and 2B. FIG. 2A is an illustration of an example pluggable module 1XA of the invention in its decomposed assembly structure, which comprises: a push/pull handle 11A, an unlocking plate 12, a base casing 13, a cover casing 14, a pair of rotation block piece 15X, a pair of rotation pin 101S, a pair of rotation block spring 102, a pair of return spring 103, a module PCB 104, and fixing screws 105. Except these, those elements that are installed inside the module casing are omitted in this illustration. FIG. 2B illustrates the integrate appearance of the example pluggable module 1XA of the invention at its primary status after assembling all the elements of FIG. 2A together. Note that, in this description, for those identical or mirrored elements or structure parts that are in symmetry in the embodiments, only one unit is given a reference sign in each drawing, and the citation of this reference sign, unless otherwise indicated, does not make a particular distinction between these identical or mirrored elements or parts to which the reference sign is referring.

Figure 3:
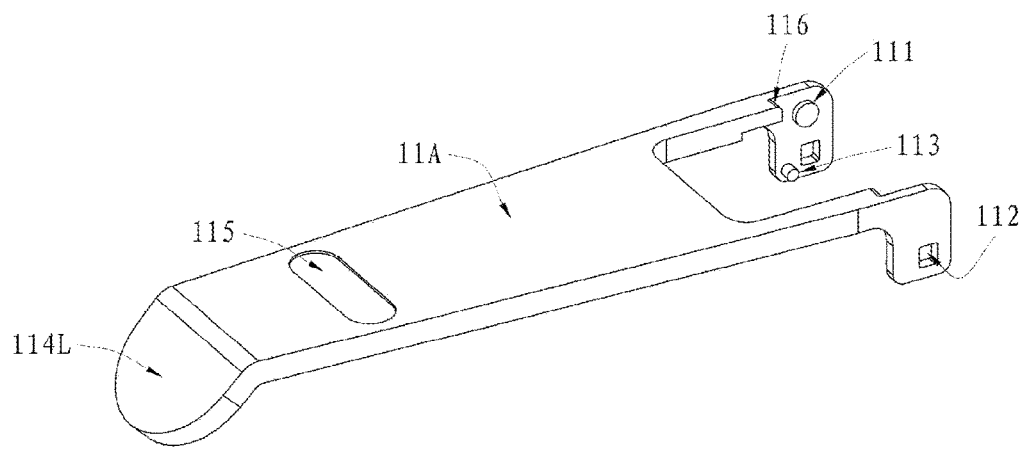
FIG. 3 is a perspective view of the detailed structure of the push/pull handle, a constituent part of the pluggable module of FIG. 2A.

FIG. 3 gives the detailed structure of the push/pull handle 11A of the example pluggable module 1XA of the invention. It contains a rotation rod 111 set at each inner face of the connecting end of the body, a resetting square hole 112 set on each side of the connecting end of the body, and a limiting rod 113 set at each inner face of the connecting end of the body. The limiting rod 113 is a cylinder piece. In addition, the special 45-degree bent part at the rear end of the body is the hand-touch end 114L, where the special bent design makes the hand-touch end 114L applicable in both pushing and pulling of the handle 11A. The circular depressed area 115 shown on the body here is used for color labeling of the optoelectronic type of modules indicating their working wavelengths, where the colors thereof are defined in relevant standards.

Figure 4:
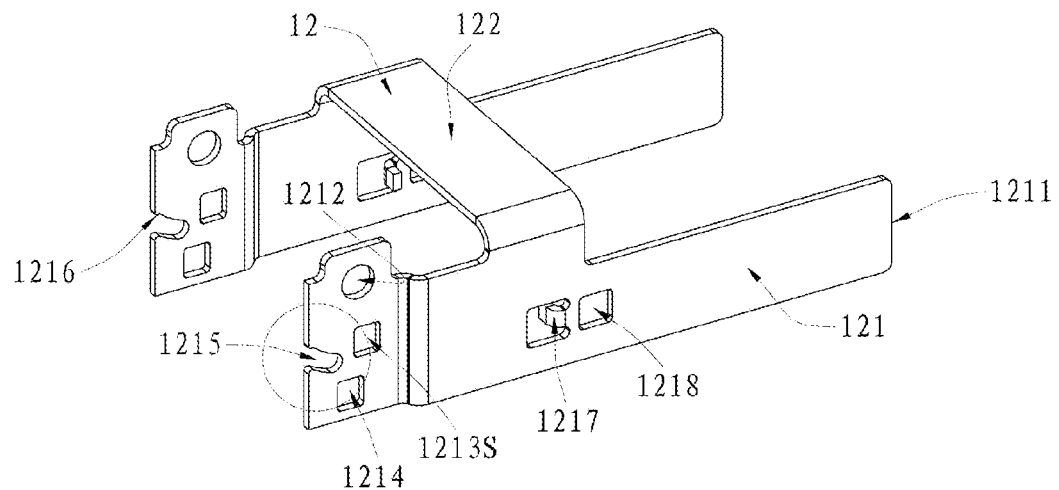
FIG. 4 is a perspective view of the detailed structure of the unlocking plate, a constituent part of the pluggable module of FIG. 2A.
Figure 5:
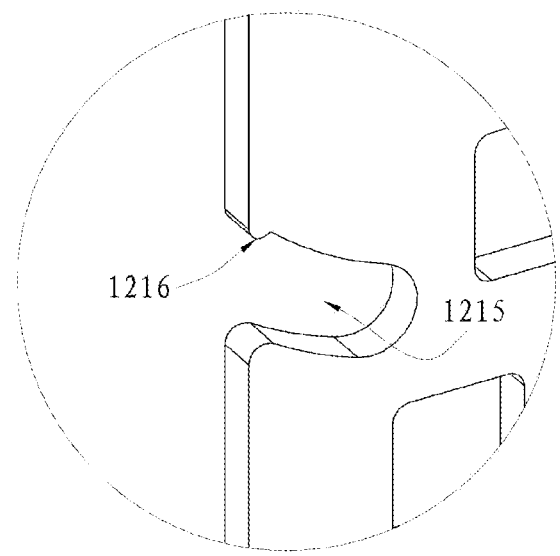
FIG. 5 is a close-up view of the partial structure of the unlocking plate of FIG. 4.

FIG. 4 gives the detailed structure of the unlocking plate 12 of the example pluggable module 1XA of the invention. Being an H-shaped profile, it contains an unlocking arm 121 in a longitudinal strip form at each side of the module casing, and a lateral connection part 122 holding the two unlocking arms 121 into an entirety. The entire unlocking plate is of a sheet structure and is mounted closely covering the casing of the module 1XA, and can slide back and forth in the longitudinal horizontal direction in relation to the casing. The part of the unlocking arm 121 facing toward the rear of the module 1XA, as the rear end of the unlocking arm 121, is the unlocking end, which contains an unlocking edge 1211, the unlocking edge 1211 here being a normal flat plate edge; the part of the unlocking arm 121 facing toward the front of the module 1XA, as the front end of the unlocking arm 121, is the connecting and control end, which contains a rotation rod connection hole 1212, a reset-pass square hole 1213S, a detention square hole 1214, a semi-closed rotation yield hole 1215, and a first limiting bump 1216 which is positioned at the joint where the upper border of the semi-closed rotation yield hole 1215 meets the front edge of the unlocking arm 121. In addition, a bent structure 1217 and a return spring mounting hole 1218 are set between the front and rear ends of the unlocking arm 121, being in the intermediate part of the unlocking arm 121, and are arranged in tandem along the longitudinal horizontal direction, where the bent structure 1217 is nearer the front side of the unlocking arm 121 with regard to the return spring mounting hole 1218. FIG. 5 gives a close-up view of the semi-closed rotation yield hole 1215 with the first limiting bump 1216 at its joint edge as indicated above along its upper border.

Among these structures, the rotation rod connection hole 1212 of the unlocking plate 12 is used to connect with the aforesaid rotation rod 111 of the push/pull handle 11A. After connection, the push/pull handle 11A can rotate with regard to the unlocking plate 12, and can push and pull the unlocking plate into a horizontal displacement as well. The semi-closed rotation yield hole 1215 of the unlocking plate 12 corresponds to the aforesaid limiting rod 113 of the push/pull handle 11A. When the push/pull handle 11A and the unlocking plate 12 are connected through the rotation rod 111 of the push/pull handle 11A and the rotation rod connection hole 1212 of the unlocking plate 12, this limiting rod 113 of the push/pull handle 11A will fall into the semi-closed rotation yield hole 1215 of the unlocking plate 12. The design of the semi-closed rotation yield hole 1215 is such that it will allow the push/pull handle 11A, under the confinement to its limiting rod 113 within the yield hole, to rotate upward from its horizontal flat position with regard to the unlocking plate 12, but can not go downward, using the working orientation of the module 1XA in FIG. 2B as a reference. Meanwhile, the first limiting bump 1216 at the said joint edge of the upper border of the semi-closed rotation yield hole 1215, will permit the push/pull handle 11A to stay at the angle where its limiting rod 113 just passes the bump, without otherwise falling back to its initial horizontal position on itself after it is rotated as driven by external force upward and the limiting rod 113 so overcomes and passes the first limiting bump 1216, the status of which can facilitate the operations such as plugging and unplugging of the cables to the module.

Figure 6:
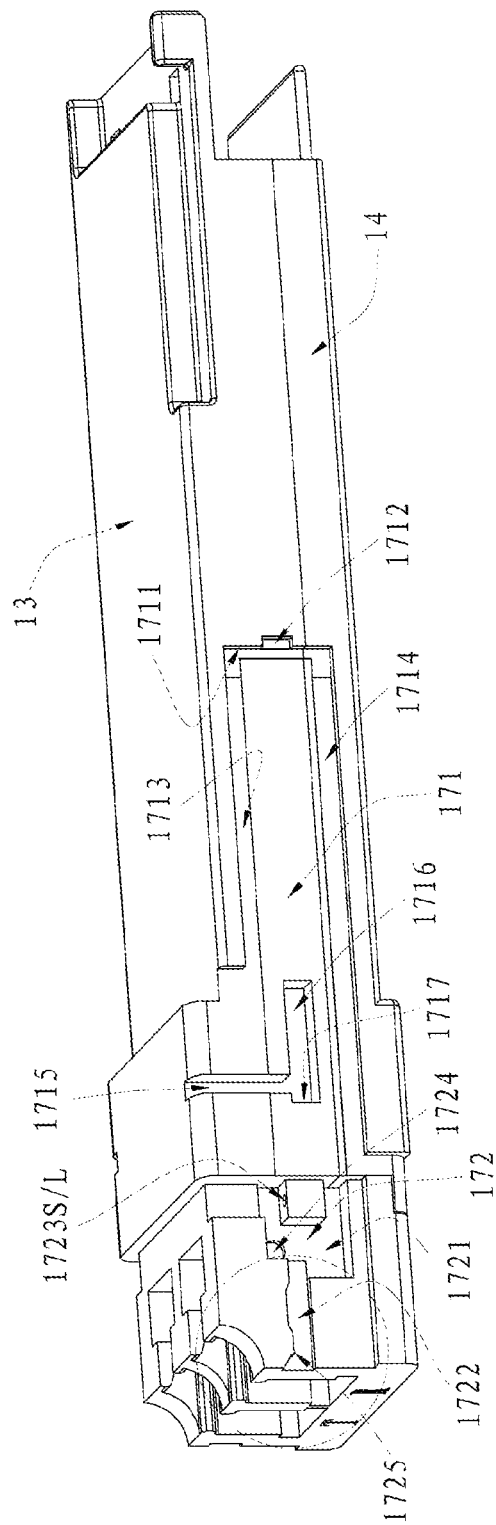
FIG. 6 is a perspective view of the detailed structure of the integrate outer casing of the module formed by assembling together the base casing and the cover casing, as constituent parts of the pluggable module of FIG. 2A.

The base casing 13 and the cover casing 14 of the module constitute the main frame to install every internal units of the module including its PCB 104, and to bear each mechanical working structures and other composing parts. For a convenient indication, FIG. 6 gives out the integrate outer casing of the module 1XA formed by fixing the base casing 13 and the cover casing 14 of the example pluggable module 1XA of the invention together through fixing screws 105. The part of the casing, on each of its lateral sides, has a first combined recess 171 adapted to the unlocking end and the central region of the unlocking arm 121, and a second combined recess 172 adapted to the control end of the unlocking arm 121.

The first combined recess 171 confines the unlocking arm 121 with regard to its upper and lower edges along its strip-like structure so that the unlocking arm 121 can only move back and forth along the horizontal direction (i.e., the longitudinal horizontal direction). In particular, in this first combined recess 171 on each side of the casing of the example pluggable module 1XA of the invention, an upper step surface 1713 and a lower step surface 1714 with coplanarity are formed, in the base casing 13 and in the cover casing 14 respectively, corresponding to the upper and lower edges of the unlocking arm 121 along its longitudinal length of its strip structure. The section of the unlocking arm 121 that falls within the first combined recess 171, only gets in touch with this upper step surface 1713 and the lower step surface 1714, so as to reduce the friction resistance between the unlocking arm 121 and the casing surface of the module 1XA during the module unlocking and resetting operations of the invention. There is another slight slope set within the rear of the upper step surface 1713 and the lower step surface 1714 extended toward the rear of the module, and within a limited rearmost area of this slop, the two steps are merged into a common slop surface. At the same time, the recess border edge at the end of the slight slop of the upper step surface 1713 and the lower step surface 1714 forms the locking step surface 1711 of the module 1XA set in this first combined recess 171 that is to engage with the cage leaf spring 21. The locking step surface 1711 is also formed by the base casing 13 and the cover casing 14 together, and about the center region of this locking step surface 1711 a dedicated recess room 1712 is formed toward the rear end of the module. Different from the prior arts where the recess room of here is to accommodate the unlocking bulge 1211' (refer to FIG. 1), the recess room 1712 set in this invention is to reduce the effective contact length between the cage leaf spring 21 and the locking step surface 1711, in order to ease the lifting of the cage leaf spring 21 by the unlocking edge 1211 of the unlocking arm 121, as compared to an entire contact width of the cage leaf spring 21, for the purpose of module unlocking operation.

The reason for that the sides of the upper step surface 1713 and the lower step surface 1714 to the rear end of the module casing are made into a slight slope region goes to the restriction of the overall width of the casing that is regulated in the related protocols and standards regarding the module 1XA. Under this restriction, the outer surface of the unlocking arm 121 can not go beyond the casing surface of the module 1XA as formed by the base casing 13 and the cover casing 14 (i.e., the outer surface of the unlocking arm 121 can not protrude outside the casing surface of the module 1XA), except that at the position of the locking step surface 1711 of the casing where the engagement with the cage leaf spring 21 takes place, it is allowed to extend beyond within a certain limit. For this, and for the guarantee of a sufficient unlock implementation by the unlocking edge 1211, that is, to guarantee a thorough separation from the locking step surface 1711 while the cage leaf spring 21 is being raised by the unlocking edge 1211, a certain defined slight slope can thus be incorporated at a rear limited region adapted in the first combined recess 171 where the unlocking edge 1211 of the unlocking arm 121 is to reach through during its unlocking operation, with the effect that when the unlocking edge 1211 arrives at the position of the locking step surface 1711, the unlocking edge 1211 is thereby lifted by the slight slope so that its edge top can be higher than the upper edge surface of the locking step surface 1711 (i.e., the casing surface), which as a result assures that the cage leaf spring 21 is totally removed out of the locking step surface 1711, safeguarding the separation between and the effect of unlocking.

Besides, a vertical mounting groove 1715, in order to allow the pass of the bent structure 1217 of the unlocking arm 121, and a horizontal longitudinal accommodation recess 1716, in order to accommodate both the bent structure 1217 and the return spring 103, are configured in the first combined recess 171. In this embodiment, the vertical mounting groove 1715 and the horizontal longitudinal accommodation recess 1716 both reside in the part of the base casing 13, in which, one end of the vertical mounting groove 1715 opens to the base ground of the base casing 13, the other connects to the horizontal longitudinal accommodation recess 1716, and in which, the internal end face of the horizontal longitudinal accommodation recess 1716 that is closer to the module front is the defined stop limit 1717, wherein this stop limit 1717 decides the ultimate location that the unlocking plate 12 can reach when it moves on the casing of the module 1XA in the direction toward the front end, by engagement with the bent structure 1217 of the unlocking arm 121.

Figure 7:
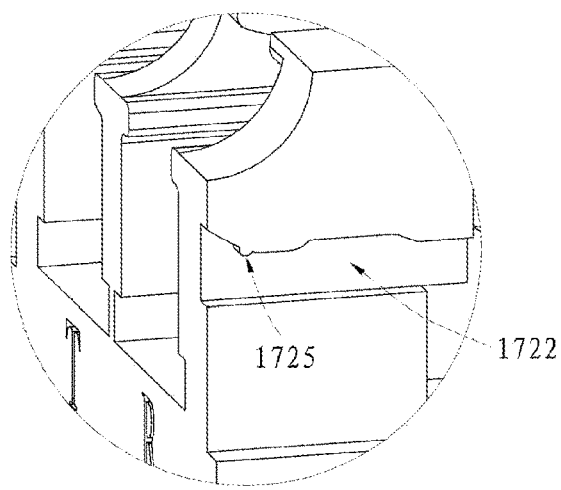
FIG. 7 is a close-up view of the partial structure of the module casing surface of FIG. 6.

The second combined recess 172 in this disclosure mainly contains two configuration sections. One is the rotation block recess 1721, to provide motion space for the rotation block piece 15X, the other the handle restriction recess 1722, to confine the motion of the push/pull handle 11A through restrictions to the limiting rod 113 there within. In this embodiment, the second combined recess 172 is only formed with the base casing 13. A vertical rotation pin hole 1723S is provided within the rotation block recess 1721, used to mount the rotation pin 101S. The rotation pin hole 1723S is of a non-through nature with a closed bottom, while the rotation pin 101S is a relatively short cylinder, with a tight fit to the rotation pin hole 1723S, so that the rotation pin 101S won't fall out in its use when the rotation pin 101S is mounted into this rotation pin hole 1723S. Another horizontal lateral accommodation hole 1724 is set in the rotation block recess 1721, used to accommodate the rotation block spring 102. With regard to the handle restriction recess 1722, its configuration is to be specified later where the motion and operating of the push/pull handle 11A are involved. In particular, among all, at a certain position along the upper border of the handle restriction recess 1722, a second limiting bump 1725 is set, which corresponds to the location of the handle limiting rod 113 when the push/pull handle 11A is at its primary, horizontal status (refer to FIG. 13A). A close-up view of this part of area is given in FIG. 7. This second limiting bump 1725 set within the handle restriction recess 1722, will permit a stability of the push/pull handle 11A of the invention when it is at its primary position, such as when the module is at its regular locked working status being installed in the equipment mounting cage, where the handle won't jump or jitter under outside vibrations or other environmental factors which otherwise leads to noises.

Figure 8:
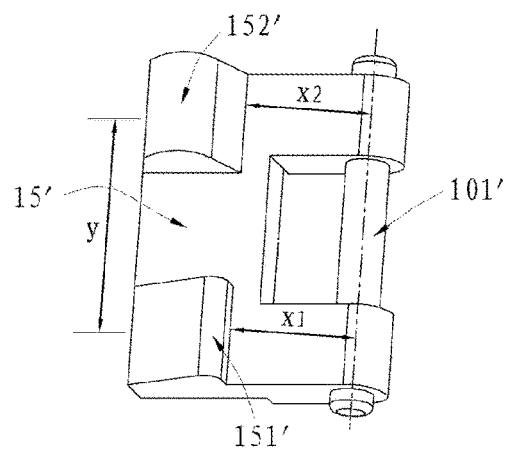
FIG. 8 is a representative illustration of one basic configuration in example, of the rotation block piece, a key element of the unlocking structure of the invention.

The rotation block piece 15X of the disclosure is the key element that determines the working mechanism of this invention as well as related quantitative designs. A representative structure 15' of a basic configuration in example, of this rotation block piece, is illustrated in FIG. 8, which can be described as a "coaxial parallel (CP)" conjoined rotation structure. As an illustration, this representative CP conjoined rotation structure 15' contains an engagement part 151', and a disengagement part 152', where the engagement part 151' and the disengagement part 152' rotate around a same axis 101' in a conjoined integrity with mutual impacts between, and at any time, if one part rotates by or to a certain angle, the other will rotate by or to the same angle along with the former; meanwhile, the engagement part 151' and the disengagement part 152' are separated in space along the axial direction of the rotation axis 101' by a certain distance y, where the value of y that is to be appointed, according to the application, should promise no structural interference or conflict between respective third party objects that are in interaction with the engagement part 151' and the disengagement part 152' respectively. That is, the engagement part 151' and the disengagement part 152' rotate about a same axis 101' in an "axial-separated" manner while together form a conjoined entirety with mutual impacts and each is to establish structural relationship with its own interactive object. Using x1 and x2 to represent, respectively, the radial distance from each working point of the engagement part 151' and the disengagement part 152' to the center of the rotation axis 101', one can get that the ratio between the rotational displacement of each working point of the engagement part 151' and the disengagement part 152' rotating about the rotation axis 101', equals to the ratio between their respective radial distance to the center of the rotation axis 101', i.e., x1/x2. In general, the engagement part 151' and the disengagement part 152' can locate by the same side of the rotation axis 101', or else can locate by the opposite side to each other. A characteristic of this CP conjoined rotation structure 15' in this disclosure is: this ratio x1/x2 (with signs) can take up a value of +1, where the effective displacements and the directions are totally the same, and else can take any value needed apart from +1. In addition, in a general principle, this CP conjoined rotation structure can include multiple engagement parts and/or disengagement parts at the same time, and the above relations apply between any engagement part and its corresponding disengagement part.

Figure 9:
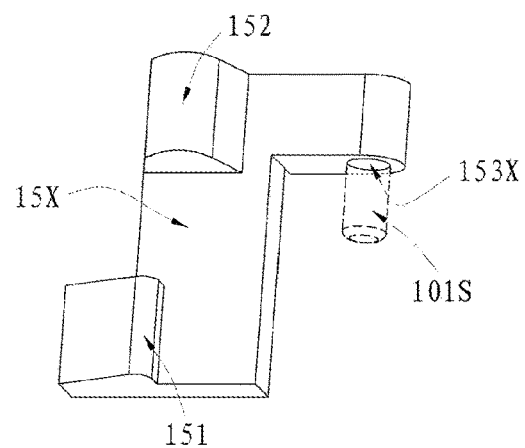
FIG. 9 is the perspective view of the specific structure of the rotation block piece, as a constituent part of the pluggable module of FIG. 2A.
Figure 10A:
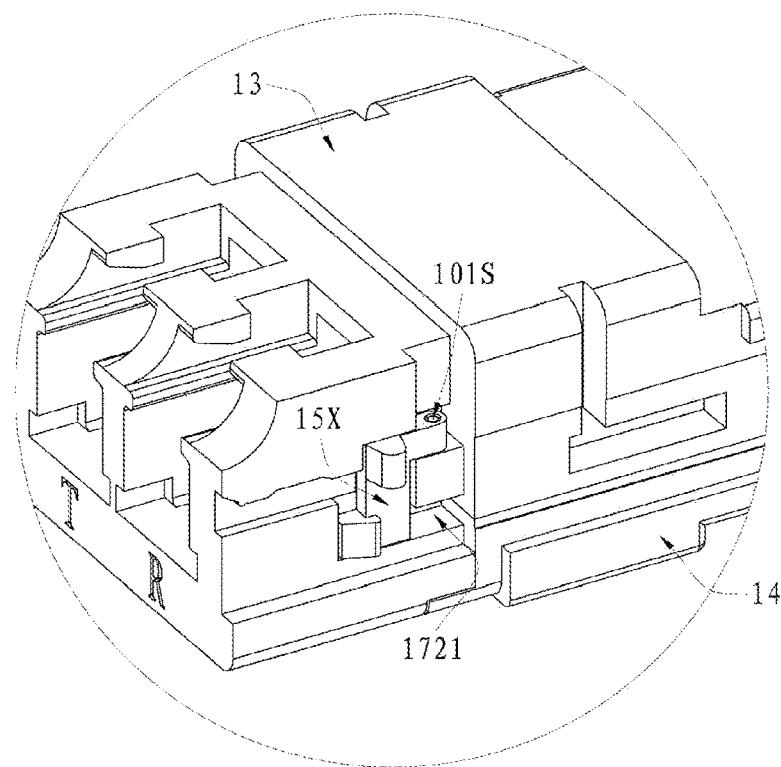
FIG. 10A is a demonstration of an example installation of the rotation block piece of FIG. 9 onto the module casing of FIG. 6.
Figure 10B:
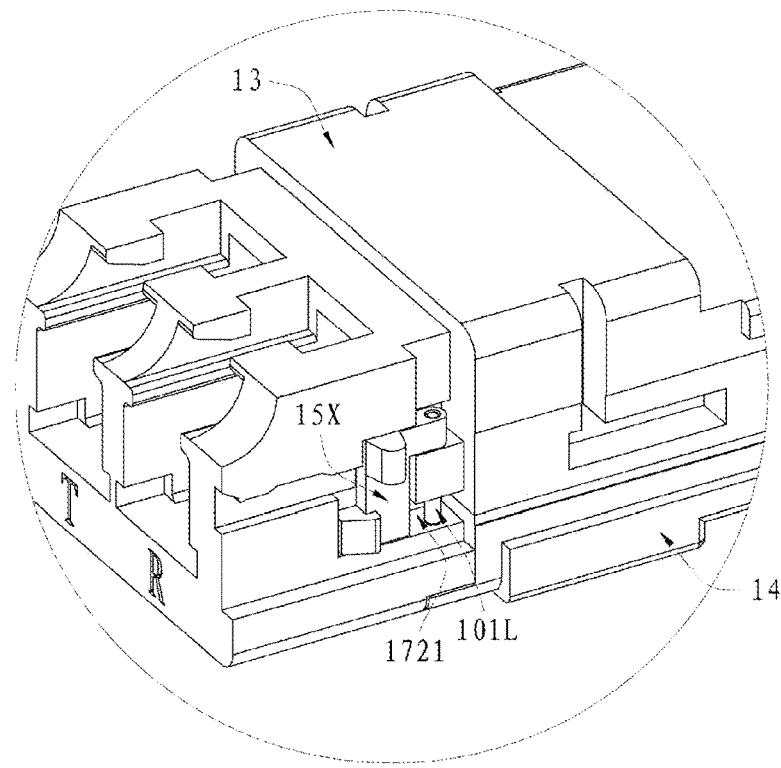
FIG. 10B is a demonstration of another example installation of the rotation block piece of FIG. 9 onto the module casing of FIG. 6.

An applied example structure of the CP conjoined rotation structure 15' in this embodiment is the rotation block piece 15X as shown in FIG. 9. The rotation block piece 15X contains a detention bulge 151 and a reset bulge 152, which correspond respectively to the engagement part 151' and the disengagement part 152' of the CP conjoined rotation structure 15', located by the same side of the rotation axis; the rotation block piece 15X is to rotate about the vertical rotation pin 101S fixed in the second combined recess 172 of the pluggable module 1XA, where a rotation hole 153X is set in the rotation block piece 15X for connection with the rotation pin 101S. Besides, the backside of the rotation block piece 15X is the working face against the rotation block spring, which can be a plain flat face. FIG. 10A demonstrates the installation of the rotation block piece 15X into the rotation block recess 1721 of the module casing by connection with the rotation pin 101S. In a better case, a rotation pin hole 1723L of a through-hole nature can be used in the rotation block recess 1721 (refer to FIG. 6), together with a relatively long rotation pin 101L, which is still with a tight fit to the rotation pin hole 1723L. FIG. 10B shows the installation under this case of the rotation block piece 15X into the rotation block recess 1721 of the module casing, from which one can know that the bottom of the rotation pin 101L can be abutted by the internal wall of the rotation block recess 1721 after mounting of the rotation pin 101L into the rotation pin hole 1723L, thus the rotation pin 101L won't fall out in its use, either. An advantage of the through-hole 1723L and long rotation pin 101L structure in FIG. 10B, compared to the non-though-hole 1723S and short rotation pin 101S structure in FIG. 10A, is that, once the rotation pin gets broken inside the rotation pin hole, the case of FIG. 10B will help removing the debris out of the rotation pin hole, better for repair management.

Figure 11:
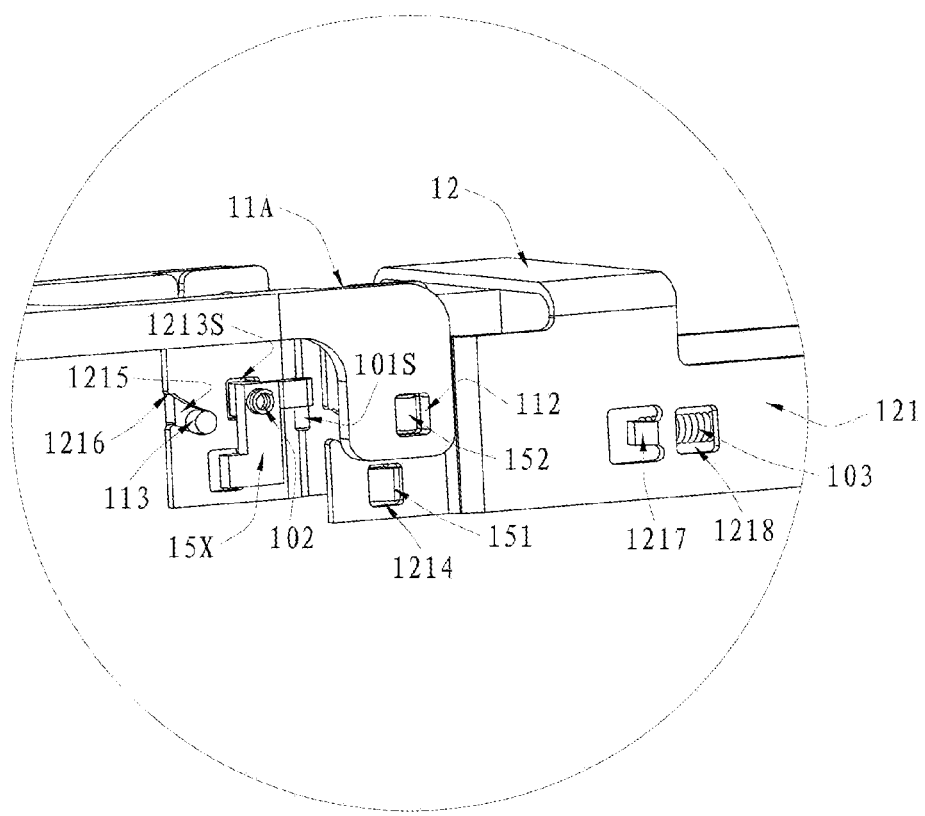
FIG. 11 is an illustration showing the relative positions among the push/pull handle, the unlocking plate, and the rotation block piece from FIG. 2A after their assembly in the module and put at the module unlocking position.

For the structure of the rotation block piece 15X as shown in FIG. 9, the detention bulge 151 is to work with the detention square hole 1214 of the unlocking plate 12 at the control end (refer to FIG. 4), and the reset bulge 152 is to work with the resetting square hole 112 of the push/pull handle 11A (refer to FIG. 3). Among them, the actual feature of the detention square hole 1214 that works with the detention bulge 151 is the pertinent hole edge supplied by the detention square hole 1214, called the detention edge; the actual feature of the resetting square hole 112 that works with the reset bulge 152 is the pertinent hole edge supplied by the resetting square hole 112, called the resetting edge. In this embodiment, a reset-pass square hole 1213S is set at the control end of the unlocking plate 12 (refer to FIG. 4), which corresponds to the location of the resetting square hole 112 of the handle 11A when the handle under connection is at its horizontal status, where the reset-pass square hole 1213S allows the reset bulge 152 of the rotation block piece 15X to pass through and thus work with the resetting edge of the resetting square hole 112 of the push/pull handle 11A. The specific way of working is as follows:

FIG. 11 illustrates the relative positions among this rotation block piece 15X, the push/pull handle 11A, and the unlocking plate 12, after their assembly in the pluggable module 1XA and put at the module unlocking position. A rotation block spring 102 is set at the back of the rotation block piece 15X, right beneath the reset bulge 152, and is accommodated in the horizontal lateral accommodation hole 1724 in the rotation block recess 1721 (refer to FIG. 6). The push/pull handle 11A, by its rotation rod 111, is connected to the unlocking plate 12 with the plate's rotation rod connection hole 1212. When the push/pull handle 11A horizontally pushes the unlocking plate 12 to the module unlocking position, i.e., the unlocking edge 1211 of the unlocking arm 121 reaches the locking step surface 1711 at both sides of the module casing (refer to FIG. 13B), the detention square hole 1214 at the control end of the unlocking arm 121, and the reset-pass square hole 1213S at the control end of the unlocking arm 121 along with the resetting square hole 112 of the push/pull handle 11A, will arrive, simultaneously, right above the detention bulge 151 and the reset bulge 152 of the rotation block piece 15X, respectively. At this moment, under the drive of the rotation block spring 102, the detention bulge 151 and the reset bulge 152 of the rotation block piece 15X will pop up and enter at the same time into the corresponding holes as indicated above, by which, the detention bulge 151 is to work with the detention square hole 1214 (its detention edge) of the unlocking arm 121 to lock the unlocking plate 12, so that the unlocking plate 12 can not get back under the drive of its return spring 103, thus the example pluggable module 1XA of this invention is maintained at the unlocked status. The effective work surface of the detention bulge 151 that is to engage with the detention edge of the detention square hole 1214 is a vertical face, so as to apply an effective locking to the unlocking plate 12. At this stage, if the pluggable module 1XA is being installed in the equipment mounting cage 2, in this unlocked status where the cage leaf spring 21 is already raised up by the unlocking edge 1211, pulling the push/pull handle 11A in the reverse horizontal direction will remove the module 1XA out of the mounting cage 2. It thus can be known that, during the module unlock and removal operations, the cables connected to the pluggable module 1XA needn't be detached.

After the pluggable module 1XA is removed from the mounting cage 2, the module needs to perform a reset, that is, to return the unlocking plate 12, with the unlocking edge 1211 moving away from the locking step surface 1711 of the module casing and back to the initial primary position, in order for a next locking upon insertion into the equipment again. At this stage, the push/pull handle 11A can be lifted up by rotating it upward, with which, the resetting square hole 112 (its resetting edge) of the push/pull handle 11A will go interaction with the reset bulge 152 of the rotation block piece 15X, where with the proceeding of the handle rotation, the resetting edge of the resetting square hole 112 successively depresses the reset bulge 152, wherein the surface of the reset bulge 152 that is to work with the resetting edge of the handle's resetting square hole 112 is a defined slope face (refer to FIG. 9). At the same moment, the detention bulge 151 that rotates conjointly in parallel with the reset bulge 152 is to retreat along with it, till freed from the engagement of the detention square hole 1214 of the unlocking plate. Up to this, the locking to the unlocking plate 12 from the rotation block piece 15X is removed and the unlocking plate 12 will turn back to the initial primary position by itself under the drive of its return spring 103, by which moment the reset operation to the module is completed. It can be known that, during this module reset operation as disclosed, the cables connected to the pluggable module 1XA needn't be detached, either.

Figure 12:
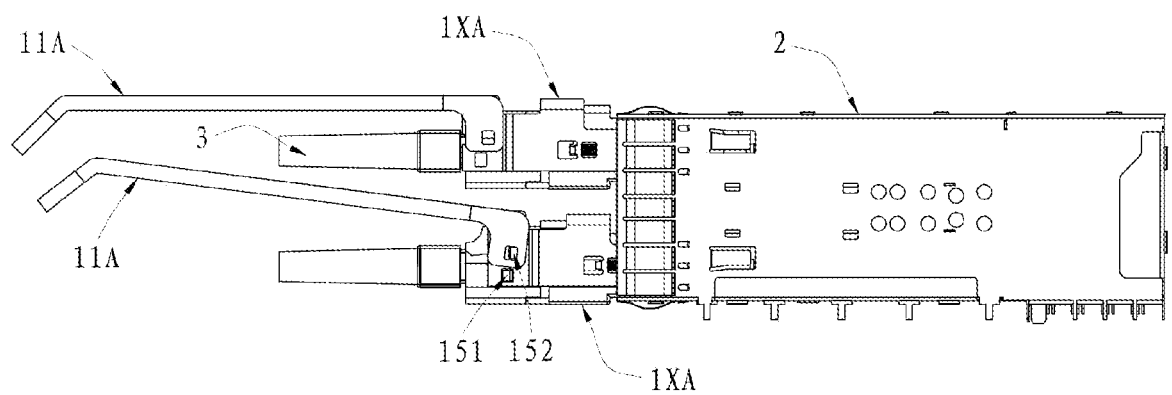
FIG. 12 is a demonstration of the in-situ resetting of the pluggable module of FIG. 2B in the case of a stacked mounting cage.

Further, it can be known that the above reset operation can be applied while the pluggable module 1XA is not removed from the mounting cage 2, where the operation is exactly the same, except that when there is a close neighboring port on the equipment panel in the vertical direction, as indicated in FIG. 12, it should be made sure that the rotating reset operation of the push/pull handle 11A will not make the handle get in touch with the above neighboring module or its attached cable 3, or, the resetting operation should not be made infeasible due to these factors. For this consideration, the structure parameters, especially the distance from the working face of the detention bulge 151 of the rotation block piece 15X to the axis of the rotation pin 101S, x1, plus the distance from the working face of the reset bulge 152 of the rotation block piece 15X to the axis of the rotation pin 101S, x2 included, can be configured in such an effect that the resetting operation of the push/pull handle 11A to the module can be confined within a designated rotation angle limit needed in order to accomplish the module reset. For example, for a certain standard stack cage in the industry shown in FIG. 12, with regard to a designed body length of 6 cm of the push/pull handle 11A, the above requirements can be met when the in-situ reset rotation angle is configured to 5.75 degrees, where the maximum rotation angle that can be applied is confined at 7.25 degrees, above which the rotation movement can not be performed (refer to FIG. 13C). These angle values for the above reset operation can be increased accordingly when the length of the handle 11A is shortened.

It can be known from the above unlock and reset operations with the push/pull handle 11A, as compared to the prior art operation of the direct-pull, since the handle movement direction of the module unlocking operation of the invention is pushing inward, opposite to the handle movement direction of outward pulling the module where it is the same operation of unlocking for the direct-pull, there won't be accidental line failure due to an unintentional removal of the pluggable module 1XA of this invention in that the direct outward-pulling of the handle of the pluggable module 1XA of the invention won't unlock it and therefore can't render it removed. At the same time, an upward touching of the handle rendering it lifted with rotation won't unlock the module either. In addition, even an unintentional engagement takes place so as to push inward the handle so far till unlocked, or, a wrong unlocking of an in-situ running module of the invention, i.e., unlocking of a module of a wrong line, happens, as long as the conduction of pulling of the module is not taken, this error can be rectified successively by performing the in-situ reset to the module thus recovering the locked status, for which cases the lines are all kept uninfluenced. All these above are the advantages that the direct-pull, and the rotation bail types can not obtain, wherein for the rotation bail, since no matter whether it is an unlock or a reset, it all calls for prior removal of the cables, therefore no matter what its case is, either a regular unlock, or a misoperation, its line interruption is always unavoidable.

In summary of the above, the unlocking structure and the operating method of the invention for the pluggable modules, provide a kind of complete operation mechanism for the module unlock and reset, and can maximally prevent misoperations and accidents from happening, while the related operations are simple and easy.

Figure 13A:
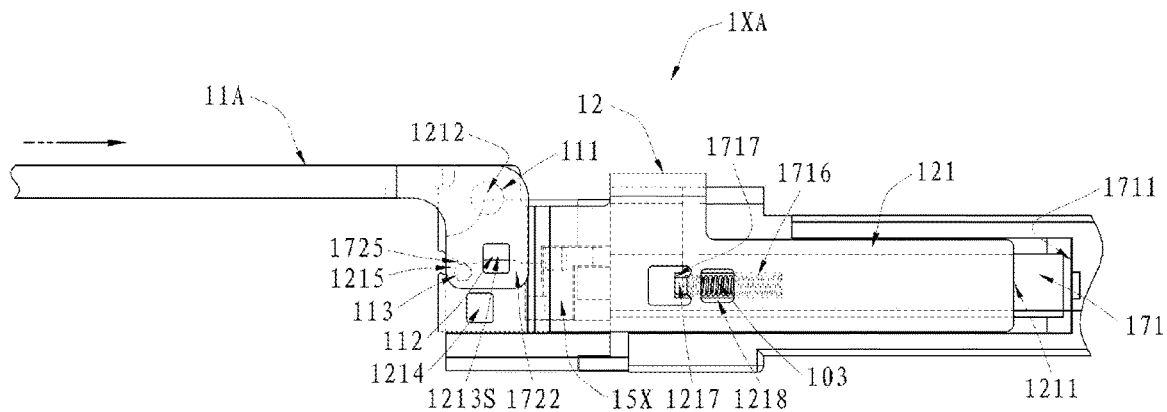
FIG. 13A is a side view of the pluggable module of FIG. 2B as in its primary position, with the push/pull handle in the horizontal status.

Based on the foregoing unlock and reset operations of the push/pull handle 11A, a description with regard to the configuration of the handle restriction recess 1722 of the example pluggable module 1XA of the invention can be specified herein. As disclosed in FIGS. 6 and 7, the handle restriction recess 1722 consists of an upper and a lower limiting borders, by which it applies position limits to the limiting rod 133 of the push/pull handle 11A. Among them, the lower border of the handle restriction recess 1722 is a horizontal flat border, which allows, in the way that the limiting rod 113 chooses to butt against it, together under confinement from partial of the upper border, the movement of the push/pull handle 11A to be controlled generally in a horizontal displacement till it reaches the unlock position, upon its pushing of the unlocking plate 12 toward the rear end of the module for an unlocking operation. FIG. 13A illustrates the position of the limiting rod 113 inside the handle restriction recess 1722 when the push/pull handle 11A is at its initial horizontal status, wherein the limiting rod 113 is butting against the second limiting bump 1725 aforementioned set in the upper border of the handle restriction recess 1722, with the effect that unless driven by a dedicated force there won't occur rotation or jumping of the handle 11A in the upward direction. The upper border of the handle restriction recess 1722 is then a combination of curved and horizontal flat surfaces, where an inner part is bent upward and the outmost side, i.e., the side by the module front, is a circular arc for yield, whereas at the rest areas where rotation of the handle 11A is not required but kept in a horizontal status, the surface is kept flat. The circular yield arc by the outmost side of the upper border of the handle restriction recess 1722, will allow the upward rotation of the handle 11A from at its initial horizontal position through its limiting rod 113, where the semi-closed rotation yield hole 1215 at the control end of the unlocking plate 12 always permits this upward rotation of the push/pull handle 11A in relation to the unlocking plate 12 through its limiting rod 113, wherein it's the same for all situations below regarding this basic yielding.

Figure 13B:
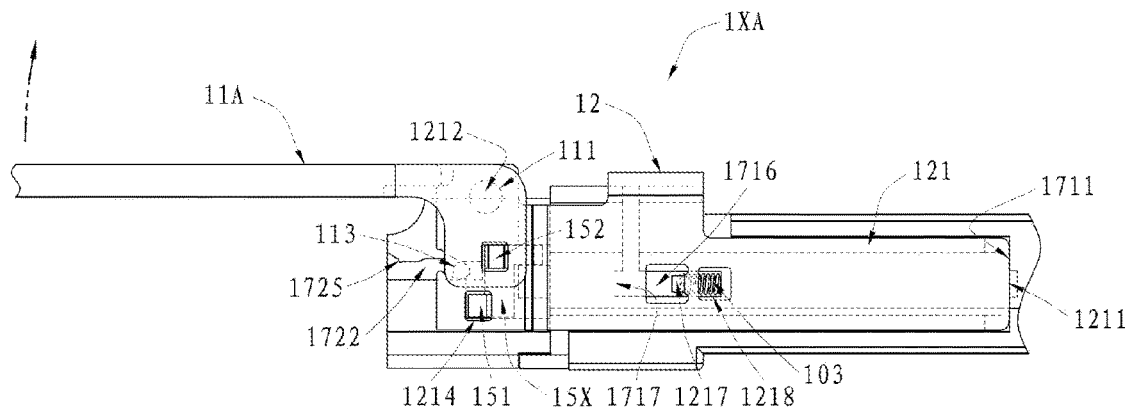
FIG. 13B is a side view of the pluggable module of FIG. 13A with the push/pull handle horizontally pushed rightward to the module unlocking position.

FIG. 13B illustrates the position of the limiting rod 113 inside the handle restriction recess 1722 when the push/pull handle 11A is horizontally pushed inward, i.e., toward the module rear end, to the module unlocking position. At this position, the unlocking plate 12 is locked by the detention bulge 151 of the rotation block piece 15X through the detention square hole 1214 of the unlocking arm 121, keeping the module 1XA at this unlocked status, under which the upper border of the handle restriction recess 1722 will allow the limiting rod 113 to rotate upward therefrom.

Figure 13C:
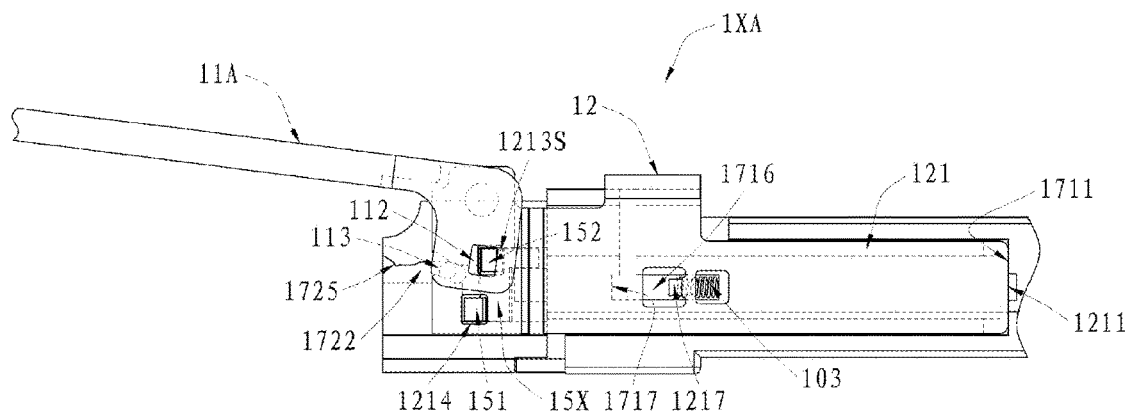
FIG. 13C is a side view of the pluggable module of FIG. 13B with the push/pull handle rotated upward from the unlocked position to the maximum allowed resetting angle.

FIG. 13C illustrates the position of the limiting rod 113 inside the handle restriction recess 1722 when the push/pull handle 11A is rotated from the unlocked position upward performing the module resetting operation till the plate detention square hole 1214 is assured of release from the locking by the detention bulge 151 of the rotation block piece 15X. As disclosed in the figure, with regard to the defined maximum allowed resetting angle of the push/pull handle 11A, the upper border of the handle restriction recess 1722 at this point is configured as such: when the limiting rod 113 rotates to this angle, the further rotation will be prohibited by this upper border, and the limiting rod 113 will be always kept below this maximum rotation angle during the retreat of the unlocking plate 12.

Figure 13D:
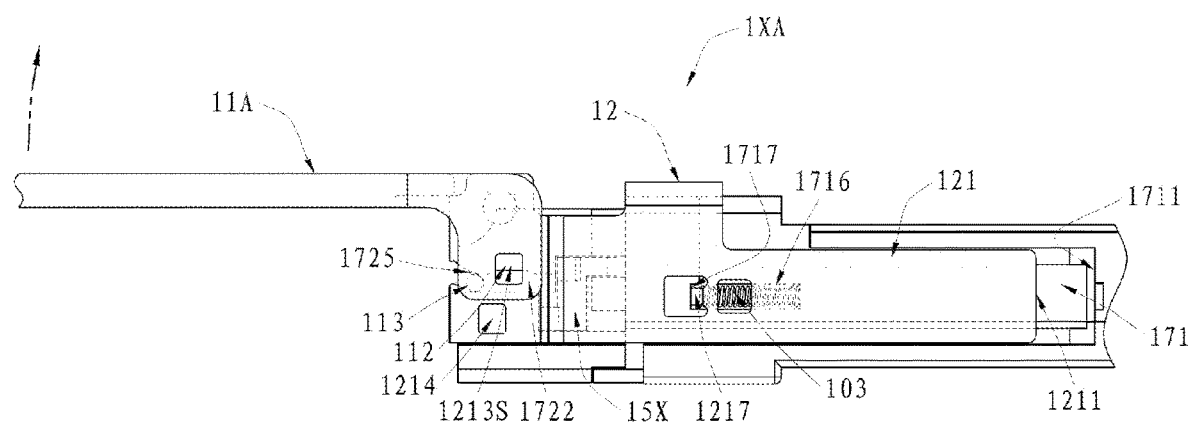
FIG. 13D is a side view of the pluggable module of FIG. 13C back to the primary position after the module reset with its push/pull handle recovered to the horizontal status.

At the maximum rotation angle of the resetting operation illustrated in FIG. 13C, the unlocking plate 12 is already released from the locking by the detention bulge 151 of the rotation block piece 15X, from which moment the unlocking plate 12 will begin to retreat automatically under the drive of the return spring 103, and at the same time the handle 11A is to be driven back to its initial horizontal status as shown in FIG. 13A or FIG. 13D, under the restrictions to the handle limiting rod 113 by the upper border of the handle restriction recess 1722. Meanwhile, the bent structure 1217 on the unlocking arm 121 is to arrive at the aforementioned stop limit 1717 in the first combined recess 171 on both sides of the module casing, representing the finish of the plate retreat, at which moment the limiting rod 113 is back at the position of the second limiting bump 1725 in the handle restriction recess 1722.

Figure 13E:
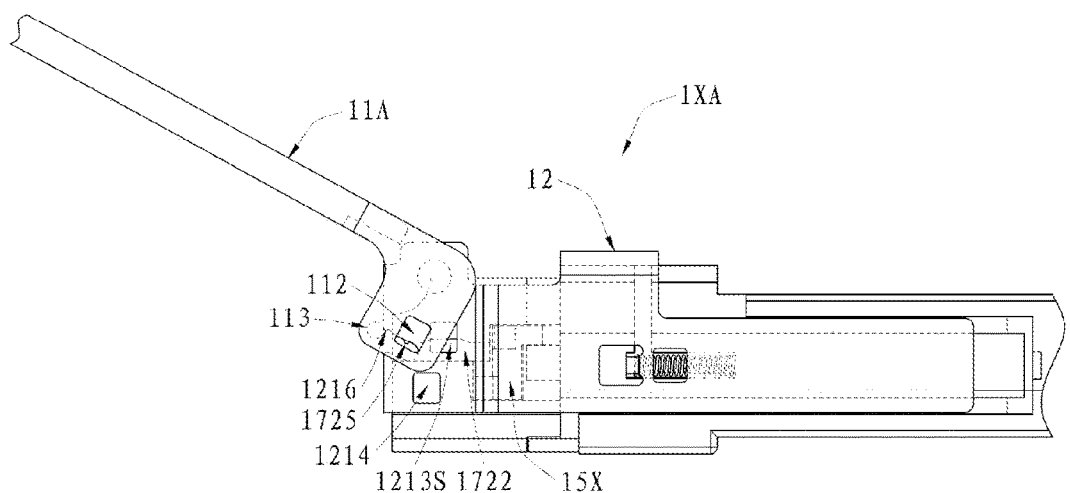
FIG. 13E is a side view of the pluggable module of FIG. 13A or 13D with the push/pull handle rotated from the primary position upward till the handle limiting rod stays just passing the first limiting bump.

In addition, FIG. 13E illustrates a status in which the push/pull handle 11A is rotated from its initial flat position upward, wherein the handle limiting rod 113 successively overcomes and passes the second limiting bump 1725 and the first limiting bump 1216, till the handle stays where the rod just passes the first limiting bump 1216. This status is configured as such: at the primary status of the example pluggable module 1XA of the invention, the handle 11A can be lifted up by rotation and rendered stationary on its own at the angle position just passing the first limiting bump 1216, which can facilitate, if needed, the operations such as plugging and unplugging of the cables to the module. To release this lifted, rotated status, and to put the handle 11A back to its flat, it only needs to press down the handle and make the limiting rod 113 go back overcoming the two limiting bumps in succession. What's more, according to this embodiment structure, it can be known that, after passing of the first limiting bump 1216, the push/pull handle 11A can proceed with this upward rotation as far as it is over flipped toward the module rear end, till the relevant part of the handle touches a corresponding part of the module casing. Although this over-flipped status is either not the purpose of the invention, nor is it the standard operation in the work and utilizations of the example pluggable module 1XA of the invention, the relevant adoptions of it may still provide a kind of operational convenience under some special occasions, such as, when performing a certain surface inspection of the ports of an optoelectronic module under a microscope, and, for a facilitation in the assembly process of the pluggable module 1XA, the latter of which to be addressed in the following content that explains the module assembly process. In the meantime, in order to prevent this unrestricted, especially for the cases of inadvertence to prevent this push/pull handle 11A, when it has passed the first limiting bump 1216, from an abrupt backward flipping due to module's posture reasons which can cause a possible damage to the relevant parts of the handle and module casing, a preventive surface rounding treatment can be taken to the handle part 116 of the push/pull handle 11A in the said embodiment, as shown in FIG. 3, which is about to get in touch with the module casing when the handle is flipped.

It can be known from the foregoing embodiment that, during the reset process of the pluggable module 1XA there exists a successive pressing of the reset bulge 152 of the rotation block piece 15X by the own body of the unlocking plate 12 starting from one edge of its reset-pass square hole 1213S when it gets released from the detention bulge 151 of the rotation block piece 15X and makes the automatic retreat under its return spring 103 (refer to FIGS. 13C and 13D); meanwhile, this extra down-press to the rotation block piece 15X from the unlocking plate's own body is already contained when the push/pull handle 11A is pushed from its initial primary position to the module unlocked position (refer to FIGS. 13A and 13B). This part of forced downward rotation of the rotation block piece 15X is not in useful connection with the module unlock and reset, and is not related to the rotating operation of the push/pull handle 11A either, but merely due to the contact with the reset bulge 152 by the body plate itself of the unlocking plate 12 during its shifting, which leads to extra down-press. This part of extra down-press rotation of the rotation block piece 15X is in essence a senseless spin for nothing. Although it does not affect the general principle of the module unlock and reset operation of the invention, it brings about issues for particular applications such that an actual applicable rotation block piece 15X can not be realized attributed to this extra down-press rotation, the motion of which necessitates extra and probably appreciable amount of allowed recess space in the lateral depth, to be supplied by the module casing, wherein for those types of modules which have quite limited rooms, it becomes an impeding issue in design.

Figure 14:
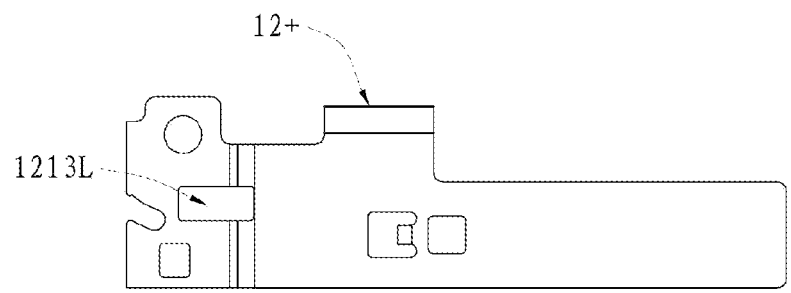
FIG. 14 is a side view of an unlocking plate of another example pluggable module of this disclosure.
Figure 15A:
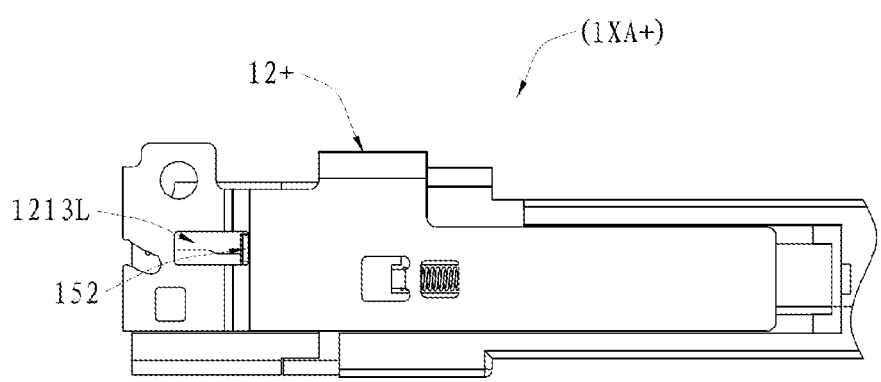
FIG. 15A is a side view of the unlocking plate of FIG. 14 being at the initial primary position on its module.
Figure 15B:
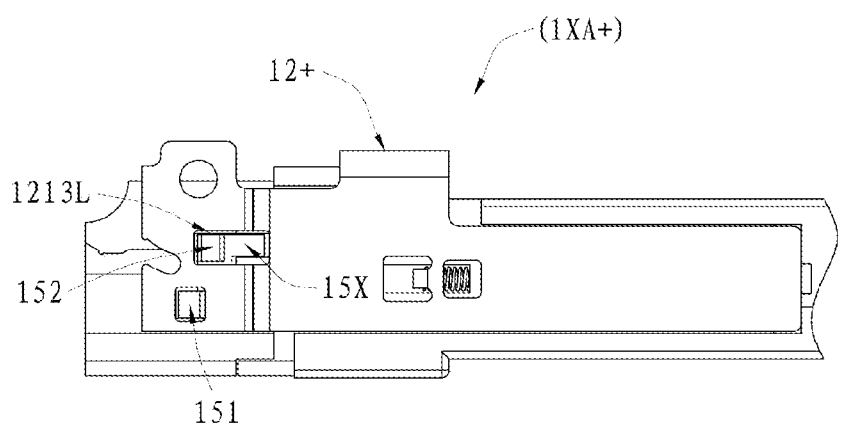
FIG. 15B is a side view of the unlocking plate of FIG. 14 being at the unlocked position on its module.

With regard to the foregoing, another embodiment of the invention is an pluggable module 1XA+ with a modification to the affecting body of the unlocking plate as compared to the foregoing pluggable module 1XA, in that the foregoing reset-pass square hole 1213S (refer to FIG. 4) is stretched into a rectangle long hole 1213L, as shown by the modified unlocking plate 12+ shown in FIG. 14. After this extension from the foregoing reset-pass square hole 1213S to the particular long hole 1213L, when operating the push/pull handle 11A for the module unlocking and resetting, this passing long hole 1213L on the unlocking plate will make pass for the reset bulge 152 of the rotation block piece 15X in the entire back and forth journey of the unlocking plate, instead of merely at the unlocked and its associated reset-waiting position. That is, the particular full-pass long hole 1213L design can totally eliminate the extra down-press effect to the rotation block piece 15X from the unlocking plate, thus sparing the space consumption of the module casing that otherwise is brought out by the former extra down-press rotations. FIGS. 15A and 15B display independently the views when the modified unlocking plate 12+ is mounted onto the module casing being at the initial primary position and the unlocked position, respectively, which can clearly reflect the passing of the rotation block piece 15X by the full-pass long hole 1213L during the entire primary-to-unlocked and reset to primary process.

Figure 16:
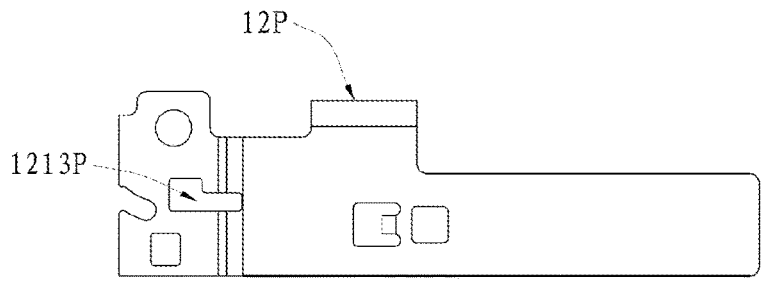
FIG. 16 is a side view of an unlocking plate in a further embodiment of the invention based on the unlocking plate of FIG. 14.
Figure 17:
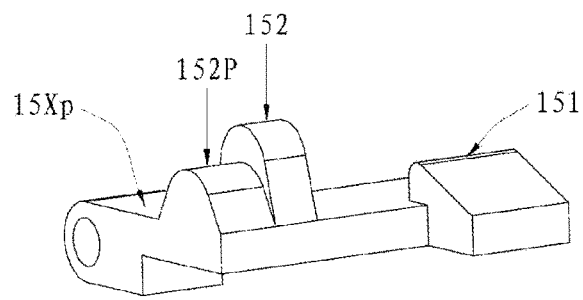
FIG. 17 is a perspective view of the rotation block piece in the embodiment associated with FIG. 16.
Figure 18A:
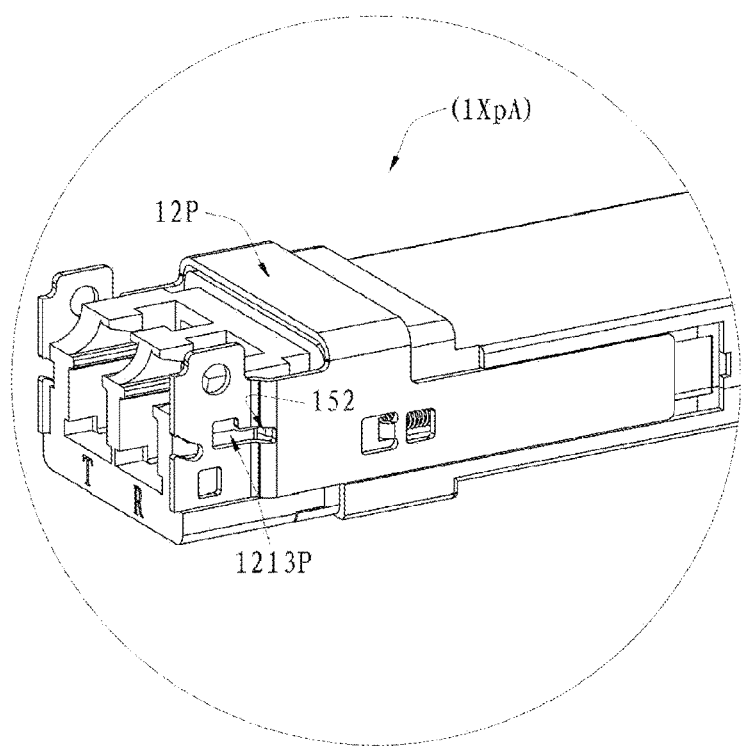
FIG. 18A is a perspective view of the unlocking plate of FIG. 16 being at the initial primary position on its pluggable module in the embodiment.
Figure 18B:
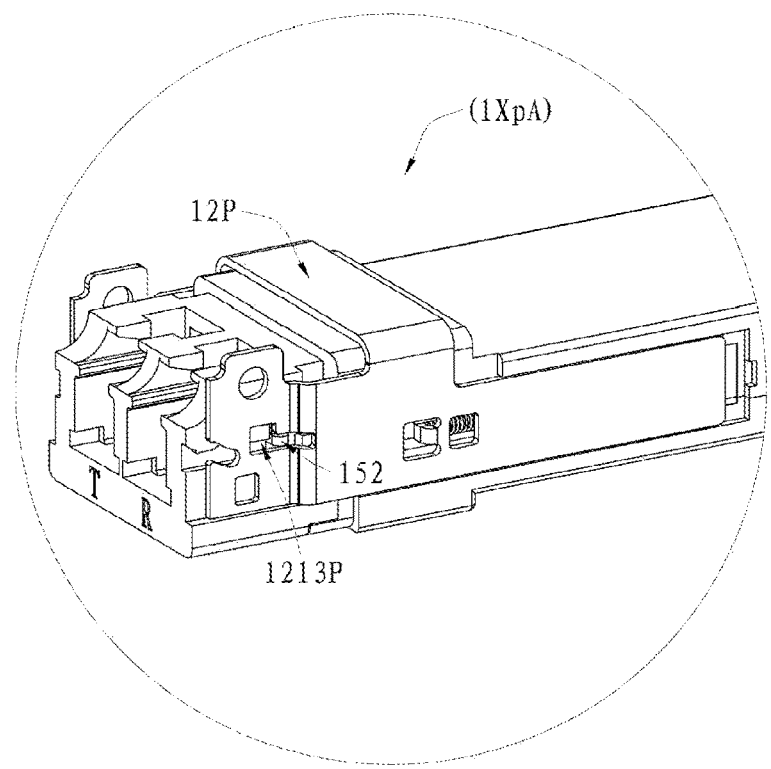
FIG. 18B is a perspective view of the unlocking plate of FIG. 16 being at the intermediate position on its pluggable module in the embodiment.
Figure 18C:
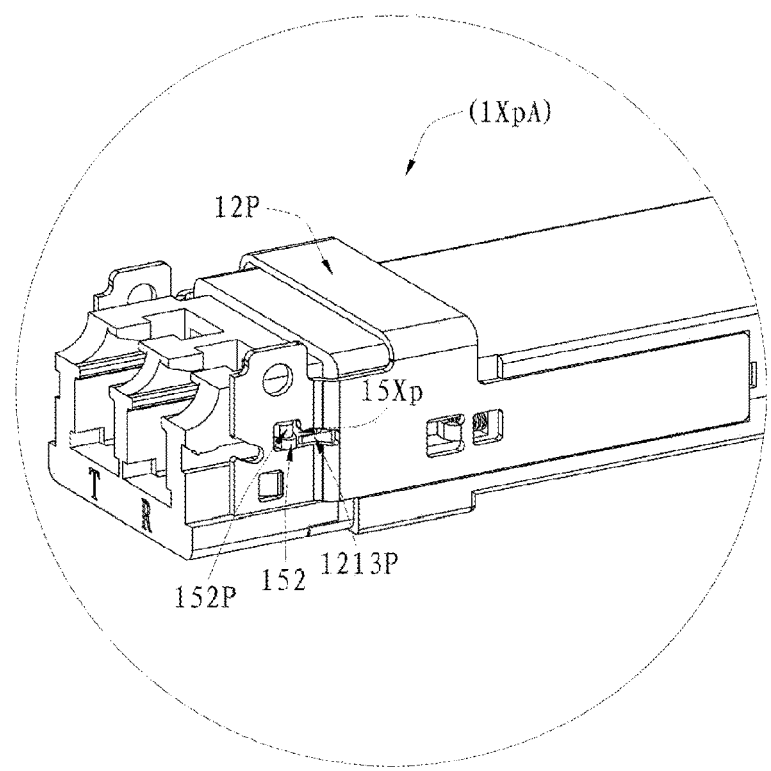
FIG. 18C is a perspective view of the unlocking plate of FIG. 16 being at the unlocked position on its pluggable module in the embodiment.

Further, a composite pass hole 1213P can be employed based on the above full-pass long hole 1213L, as shown in FIG. 16, in which a short hole area, being an auxiliary control hole, is added along and in parallel with the above full-pass long hole; at the same time, an auxiliary control bulge 152P is added alongside the foregoing reset bulge 152 of the rotation block piece 15X, as the rotation block piece 15Xp shown in FIG. 17. Among these, the reset bulge 152 corresponds to the lower long hole area of the composite pass hole 1213P of the unlocking plate 12P as given in FIG. 16, wherein the long hole area functions the same as the full-journey pass to the reset bulge 152 as by the full-pass long hole 1213L of the former pluggable module 1XA+; the auxiliary control bulge 152P then corresponds to the upper short hole area of the composite pass hole 1213P of the unlocking plate 12P shown in FIG. 6, wherein the short hole area functions the same as the limited pass to the reset bulge 152 of the foregoing rotation block piece 15X as by the reset-pass square hole 1213S of the foregoing pluggable module 1XA. As the auxiliary control bulge 152P does not undertake the reset duty, but rather independent from the reset bulge 152, thereby its height can be defined separately, with which a design can be obtained as such that within a certain scope any needed degree of the down pressing of the rotation block piece 15Xp can be achieved with the unlocking plate 12P. This arbitrarily configurable down-pressing feasible in a certain range can be useful or needed in some applications, such as to relieve the contact impact between the profile edge of a handle and the protruding reset bulge 152 of a rotation block piece under some designs, in respect of the motion process that the push/pull handle 11A moves from the initial primary place to the module unlocking place. FIGS. 18A-18C respectively illustrate the representative relations between the unlocking plate 12P and the rotation block piece 15Xp when the corresponding pluggable module 1XpA in this embodiment is at its primary, intermediate, and unlocked positions, which present the effect of this joint working of the unlocking plate's composite pass hole 1213P and the rotation block's composite structure that includes the reset bulge 152 and the auxiliary control bulge 152P.

Represented by the example pluggable module 1XA among the above embodiments, with references to the relevant foregoing drawings, the assembly process and the related parts assembling details of the above example pluggable modules of the invention are specified below:

Step 1: Connect the rotation rod 111 of the push/pull handle 11A to the rotation rod connection hole 1212 of the unlocking plate 12, finishing the assembly between the push/pull handle 11A and the unlocking plate 12. When assembled, the limiting rod 113 of the push/pull handle 11A falls in the semi-closed rotation yield hole 1215.

Step 2: Mount the rotation pin 101S (101L) into the rotation pin hole 1723S (1723L) in the second combined recess 172 on the sides of the base casing 13, where the assembly between the rotation pin and the rotation pin hole is a tight fit, after which a part of the rotation pin 101S (101L) appears out of the top of the rotation pin hole 1723S (1723L). Then, with a 90-degree rotated angle, sleeve the rotation block piece 15X by its rotation hole 153X onto the part of the rotation pin 101S (101L) that is exposed out of the rotation pin hole 1723S (1723L). When in position, rotate the rotation block piece 15X down into the rotation block recess 1721, by which finishing the initial mounting of the rotation block piece 15X into the base casing 13. When done, the mounted rotation block piece 15X can rotate around the rotation pin 101S (101L) back and forth.

Step 3: Rotate the initially mounted rotation block pieces 15X on the both sides with a certain angle, while putting the rotation block spring 102 into the horizontal lateral accommodation hole 1724 in the rotation block recess 1721 respectively under each rotation block piece 15X, and then hold the rotation block springs 102 by pressing down simultaneously the rotation block pieces 15X on the both sides with fingers or some simple tool. In succession, put the bent structures 1217 on both sides of the unlocking plate 12, through the vertical mounting grooves 1715 in the first combined recesses 171 on the sides of the base casing 13, into these vertical mounting grooves 1715 from top to bottom, at which moment the unlocking plate 12 is partially in connection to the base casing 13 waiting for a complete mounting in. Especially, during the process, the push/pull handle 11A formerly assembled to the unlocking plate 12 can be flipped backward toward the module rear end beforehand, in order to spare temporarily the positioning of the handle limiting rod 113 into the handle restriction recess 1722 at the front end of the base casing 13. Afterward, proceed with the mounting of the unlocking plate 12 downwardly in the way that as soon as the unlocking arms 121 begin to touch the fingers or tools that are pressing the rotation block pieces 15X, release gradually the fingers or tools so that the unlocking arms take place of the fingers or tools during the downward heading continuously pressing down the rotation block pieces 15X, until the unlocking arms 121 fully adapt into the first combined recesses 171 on both sides of the base casing 13, up to which the mounting of the unlocking plate 12 onto the base casing 13 is completed. When the unlocking plate 12 is mounted in place, its bent structure 1217 is within the horizontal longitudinal accommodation recess 1716 in the first combined recess 171 on each side of the base casing, at which moment the unlocking plate 12 can be slidden to its foremost position toward the module front, after which the formerly backward flipped push/pull handle 11A can be flipped back and pressed down to the flat position, by which and at which point the handle limiting rod 113 enters into the handle restriction recess 1722 at the module front casing, and the push/pull handle 11A can then drive the unlocking plate 12 into back and forth sliding in the horizontal direction.

Step 4: Insert the return spring 103, through the return spring mounting hole 1218 on the unlocking arm 121, into the horizontal longitudinal accommodation recess 1716 on each side of the base casing 13, where one end of the spring butts against the arm's bent structure 1217, the other end butts against the internal face of the horizontal longitudinal accommodation recess 1716 close to the module rear end, upon which moment, the unlocking plate 12 will be under the drive from the return spring 103 and slide automatically to the position where its bent structure 1217 butts against the internal face of the casing's horizontal longitudinal accommodation recess 1716 nearer the module front end, i.e., the aforementioned stop limit 1717. Up to this, the assembling of every main part of those on the casing of the pluggable module 1XA onto the base casing is completed.

Step 5: Complete the mounting of the internal elements inside the base casing 13 including the module PCB 104.

Step 6: Connect the cover casing 14 onto the base casing 13 by fixing screws 105. The module assembly is finished.

From within the assembly process and the contents above, it can be drawn that, with the above example pluggable modules of the invention, the assembly process is fast and simple, the assembled being firm and stable, with no hidden issue, and no special or particular tools are needed either, which provides good applicability in handling. Meanwhile, the parts unmounting and replacement are quite easy, such as the key element of the above embodiments, the rotation block piece 15X/Xp, of which the unmounting and replacement with regard to the rotation pin 101S/L is essentially a swift-style operation in which the conduction can be finished in no time, wherein the rotation pin 101S/L can be a permanent installed part and doesn't need unmounting unless broken.

Figure 19:
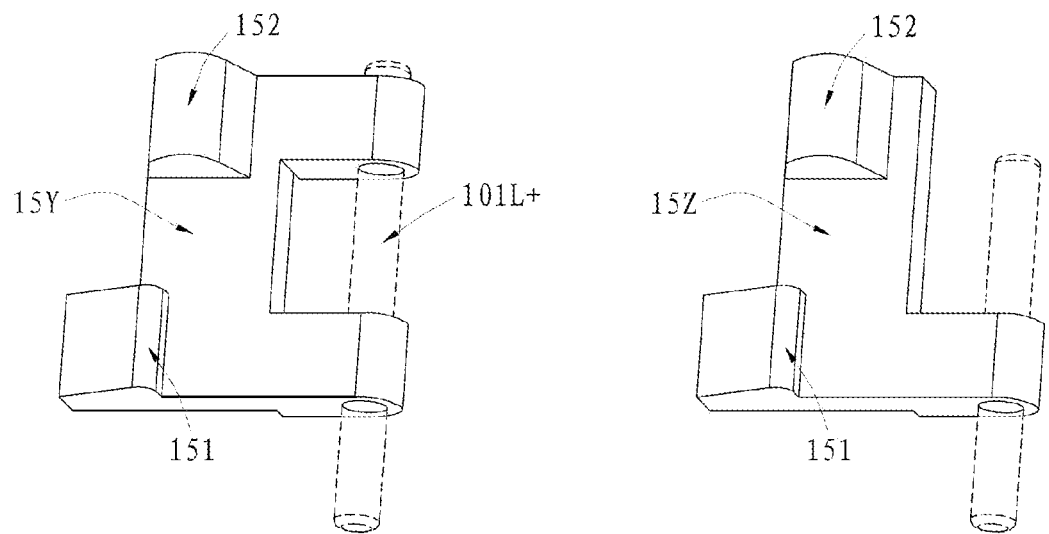
FIG. 19 is a perspective view of a twin-linkage rotation block piece and another single-linkage rotation block piece in accordance with the basic configuration of FIG. 8 of the rotation block piece.
Figure 20:
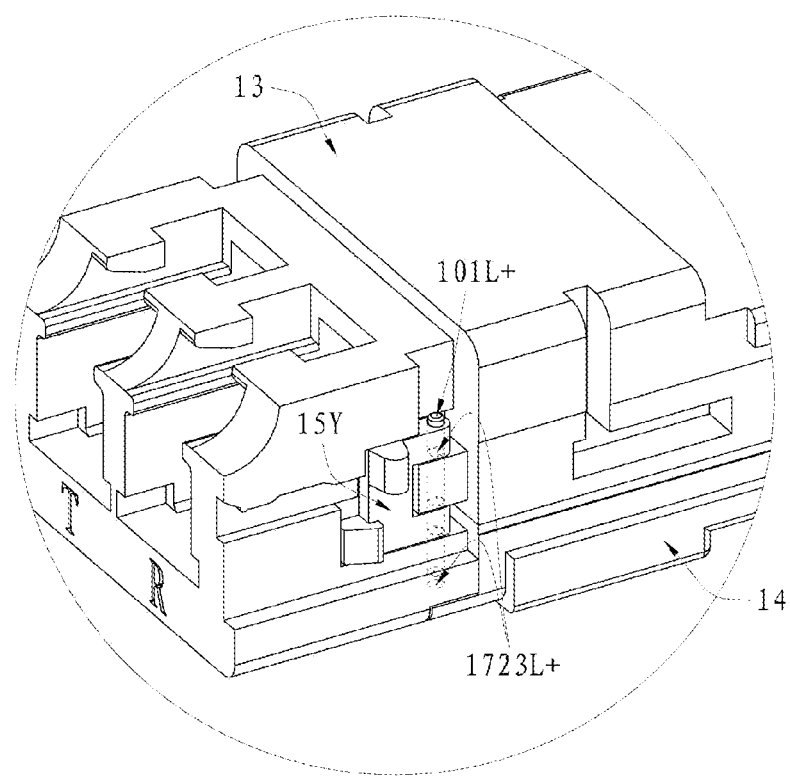
FIG. 20 is a demonstration of the installation of the twin-linkage rotation block piece of FIG. 19 onto the casing of a corresponding pluggable module in this disclosure.

Apart from the foregoing rotation block piece 15X in the above embodiments, the CP conjoined rotation structure 15' in this disclosure can be applied in the rotation block structures as shown in FIG. 19, where it includes a twin-linkage rotation block piece 15Y and another single-linkage rotation block piece 15Z. The rotation block piece 15X in the foregoing embodiments is of a kind of single-linkage. Under different module embodiment structures or needs, either the foregoing single-linkage rotation block piece 15X or the single-linkage rotation block piece 15Z of FIG. 19 can be put in consideration. The twin-linkage rotation block piece 15Y is to strengthen or improve certain properties of the rotation block piece such as operation precision, strength reliability, etc. The installation of this twin-linkage rotation block piece 15Y onto the casing of its corresponding example pluggable module 1Y of the invention is shown in FIG. 20 (the complete illustration of the module 1Y being omitted), wherein, in consideration of the adaptation to the concurrent linkages to the rotation pin 101L+ by the detention bulge 151 and the reset bulge 152 of the rotation block piece 15Y and the fabrication limits, a hole is to be formed from the side of the base casing 13 that connects to the cover casing 14, in order to produce the up-and-down through rotation pin hole 1723L+ as shown. When the cover casing 14 and the base casing 13 are assembled together, the cover casing 14 will block up the bottom opening of the rotation pin hole 1723L+, the assembly between the rotation pin 101L+ and the rotation pin hole 1723L+ still being a tight fit, the rotation pin 101L+ therefore won't fall out during its use under this structure as well. In addition, similar to the relevant foregoing embodiments, the twin-linkage rotation block piece 15Y and the single-linkage rotation block piece 15Z in FIG. 19 can incorporate the auxiliary control bulge 152P too, under dedicated applications.

Figure 21A:
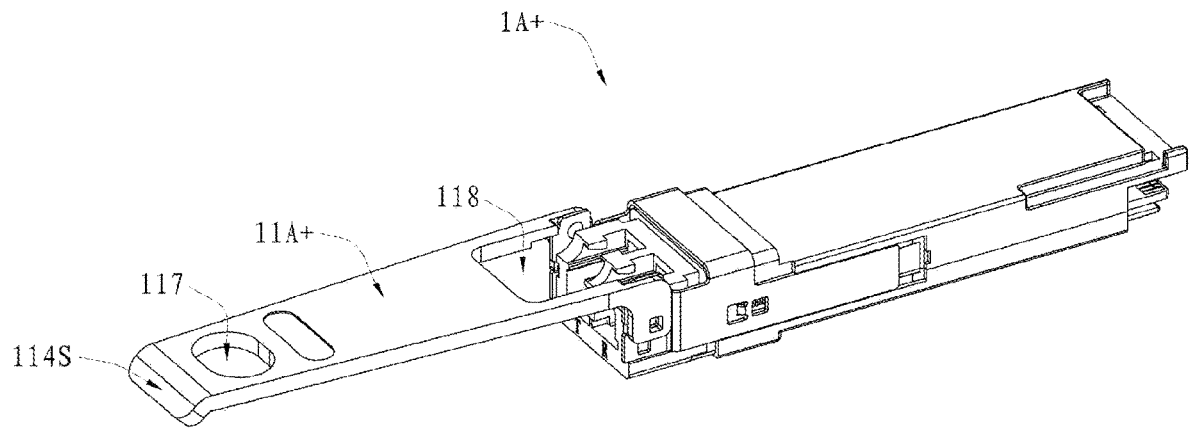
FIG. 21A is a perspective view of a pluggable module of this disclosure with an example long-body push/pull bail.
Figure 21B:
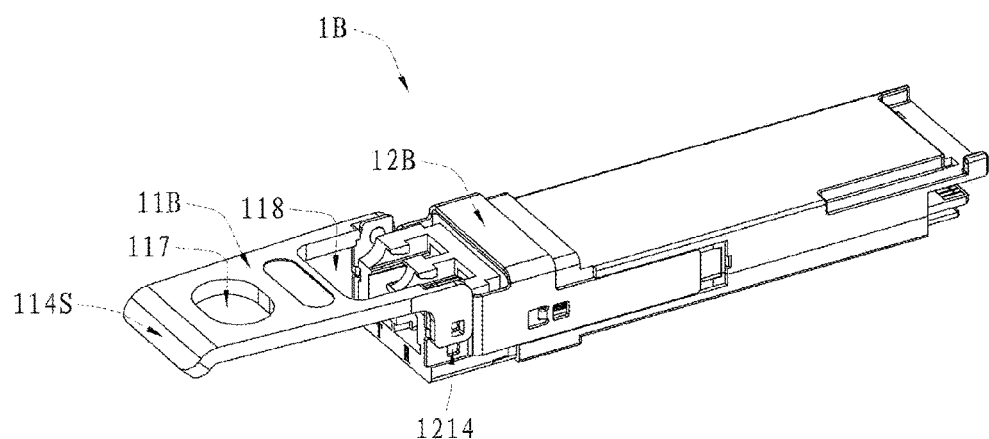
FIG. 21B is a perspective view of a pluggable module of this disclosure with an example short-body push/pull bail.
Figure 21C:
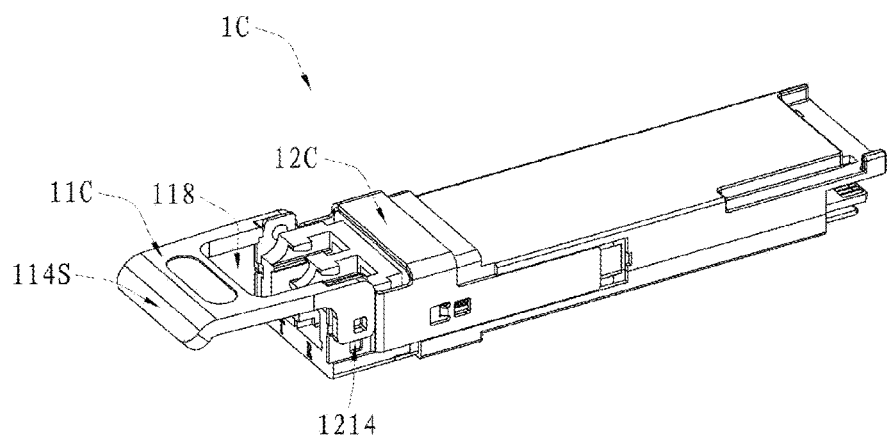
FIG. 21C is a perspective view of a pluggable module of this disclosure with an example shortest-body push/pull bail.

In other embodiments of this invention, according to the applied port layout on the equipment panel, including its orientation, and taking into account the circumstance considerations and needs regarding the cable deployments, the basic body shape of the push/pull handle 11A can take that of the push/pull bail 11A+, 11B, 11C of the pluggable module 1A+, 1B, 1C as shown respectively in FIGS. 21A-21C, in which Module 1A+ is kept a long handle relatively, whereas Module 1B and Module 1C are short handle designs. In these embodiments, a modification is taken to the former specially 45-degree bent hand-touch end 114L of the push/pull handle 11A in the foregoing embodiments, in which the size of the bent part is reduced such that it turns to a push/pull bail rear end 114S that focus mainly on the pushing, along with which a hollow, ring-shaped structure 117 at the rear part of the handle is added, or else a shortest handle design as in FIG. 21C is adopted utilizing directly the U-shaped hollow structure 118 at the connecting end of the handle where an unlocking plate is connected, both of which serve as the means for assistance in the pulling operation. Among them, with regard to the short-body designs as in FIG. 21B and FIG. 21C, the reset rotation angle can be and needs to be increased by a certain amount, compared to the foregoing long-handle situations. For this reason, modifications can be done such as decreasing the distance from the detention bulge 151 of the adapted rotation block piece 15X/Y/Z (not visible in the drawings associated) to the axis of the rotation pin, i.e., the aforementioned x1 (refer to FIG. 8), while at the same time adjusting accordingly the position of the detention square hole 1214 on the unlocking plate 12/B/C, the cases of which where such adjustments are performed to the detention square hole 1214 can be as illustrated in FIGS. 21B and 21C.

In terms of the push-pull style of the unlocking and other operations of the pluggable modules of this disclosure, the push/pull handle or bail of the pluggable modules of the disclosure is in its whole made of such as metals, for example, a light-weight aluminum alloy.

Figure 22:
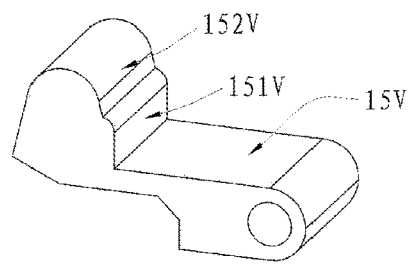
FIG. 22 is a perspective view of the rotation block piece of another basic configuration in example, a key element of the unlocking structure of the invention.

FIG. 22 gives another example basic configuration of the rotation block piece of the invention. It's a rotation block piece 15V where the detention bulge and the reset bulge are laid and superimposed in the vertical direction. This vertical-superimposed rotation block piece 15V combines the detention bulge and the reset bulge into a same bulge, along the vertical height of which the profile is divided into two working sections as an upper section and a lower section, the lower section being the detention section 151V, and the upper section being the reset section 152V, which, respectively, retain the working face properties of the detention bulge 151 and the reset bulge 152 of the rotation block pieces in the foregoing embodiments. As compared to the former "axial-separated" "coaxial parallel" conjoined rotation structure, this vertical-superimposed structure can be described as "vertical-separated" "coaxial superimposed" conjoined rotation structure.

Figure 23:
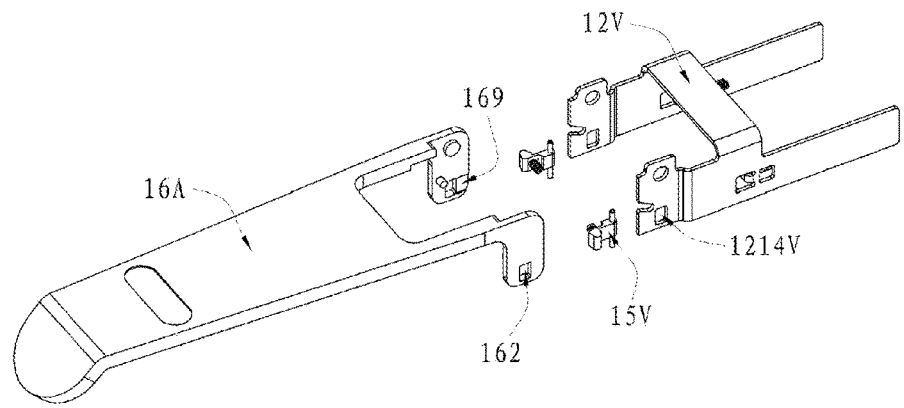
FIG. 23 is a decomposed perspective view of a push/pull handle, an unlocking plate, with and based on the rotation block piece of FIG. 22 in another embodiment of the invention.
Figure 24:
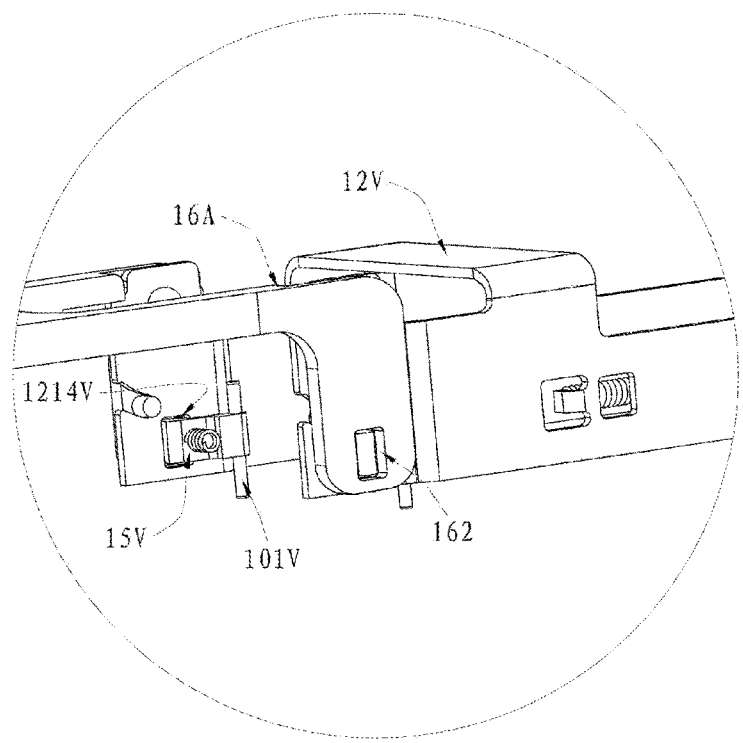
FIG. 24 is an illustration showing the relative positions among the push/pull handle, the unlocking plate, and the rotation block piece of FIG. 23 after their assembly in its pluggable module in the embodiment and put at the module unlocking position.
Figure 25:
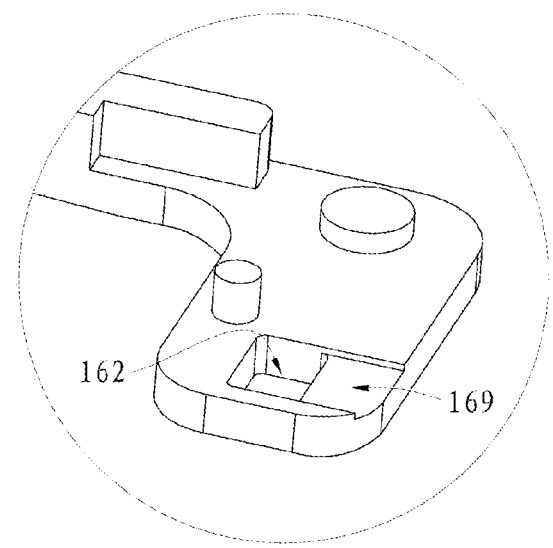
FIG. 25 is a close-up view of the partial structure of the push/pull handle of FIG. 23 at another perspective angle.

Based on the vertical-superimposed rotation block piece 15V, FIG. 23 gives a decomposed illustration in relation to a corresponding pluggable module IVA with regard to its push/pull handle 16A, unlocking plate 12V, and this rotation block piece 15V. FIG. 24 illustrates the relative positions among these three at the module unlocking position after their assembly in the module IVA. For the push/pull handle 16A and unlocking plate 12V, most parts of the structures are the same as the foregoing embodiments, as in reference to FIGS. 3 and 4, whereas the differences lie as: the resetting square hole 112 of the foregoing push/pull handle 11A here turns to a composite structure, which includes a rectangular resetting hole 162—it contains a resetting edge, and a detention-yield recess 169 which is formed on the inner side of the handle and in conjunction with the rectangular resetting hole 162 (and with its resetting edge), a close-up view of this difference area being given in FIG. 25; the detention square hole 1214 and the reset-pass square hole 1213S of the foregoing unlocking plate 12 here merge into a same rectangular composite detention hole 1214V, wherein this composite detention hole 1214V provides both a detention edge that is to work with the detention section 151V of the rotation block piece 15V for the locking of the unlocking plate 12V, and reset passing to the reset section 152V of the rotation block piece 15V which is superimposed above the detention section 151V, at the same time.

Figure 26:
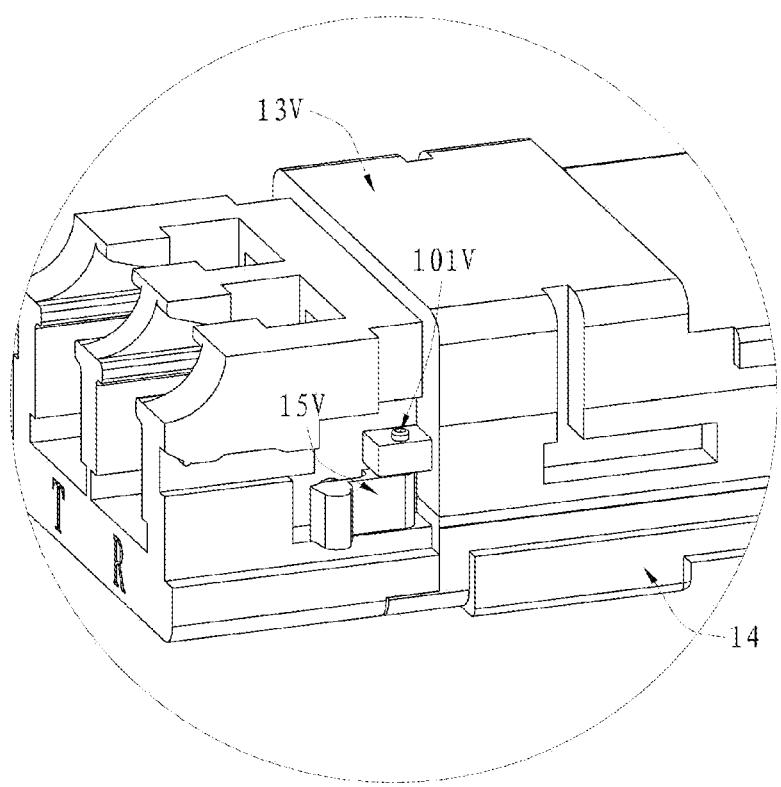
FIG. 26 is a demonstration of the installation of the rotation block piece onto the casing of its pluggable module in the embodiment associated with FIG. 23.
Figure 27A:
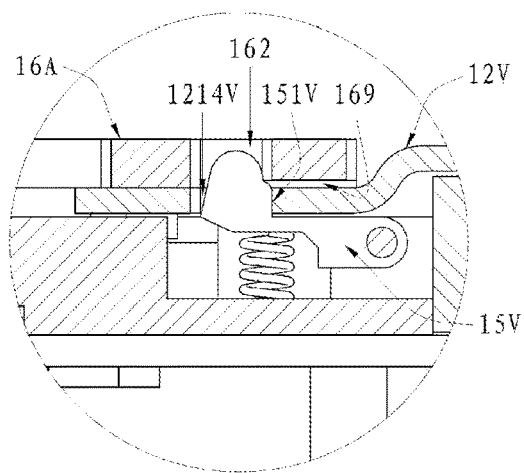
FIG. 27A is a cross-sectional view showing the interactions among the push/pull handle, the unlocking plate, and the rotation block piece of FIG. 23 when assembled onto the casing and put at the unlocking position of its pluggable module in the embodiment.
Figure 27B:
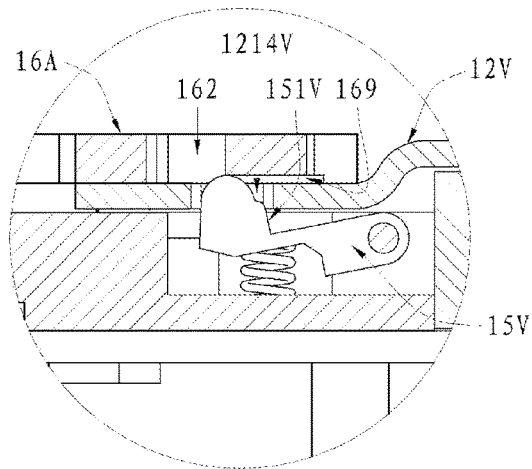
FIG. 27B is a cross-sectional view showing the interactions among the push/pull handle, the unlocking plate, and the rotation block piece when the push/pull handle in FIG. 27A is rotated to the maximum resetting angle allowed.

FIG. 26 shows a demonstration of the installation of the rotation block piece 15V onto the module casing of the pluggable module IVA. FIG. 27A illustrates the interactions among the above three parts when assembled onto the casing of the pluggable module IVA and put at the module unlocking position, in a cross-sectional view, where it can be clearly seen that the function of the detention-yield recess 169 of the handle 16A that is in adaptive conjunction with the handle's rectangular resetting hole 162 is to allow an upper yielding room for the detention section 151V of the rotation block piece 15V so that the detention section 151V of the rotation block piece 15V can partially stick out of the composite detention hole 1214V of the unlocking plate 12V for an effective locking. FIG. 27B illustrates the interactions among these three assembled on the casing of the pluggable module IVA when the push/pull handle 16A performs the resetting rotation under this module unlocked position and rotates to the maximum resetting angle allowed, in a cross-sectional view (note: for principle purpose only where an actual case being better than the illustrated), wherein the defined maximum resetting angle allowed adopts the same base in the foregoing embodiments as for the given standard stack cage in the industry (refer to FIG. 12), i.e., 7.25 degrees. It can be clearly seen from FIG. 27B that when the handle 16V rotates to this angle, the unlocking plate 12V is already released from the locking by the detention section 151V of the rotation block piece 15V and is able to automatically retreat.

Figure 27C:
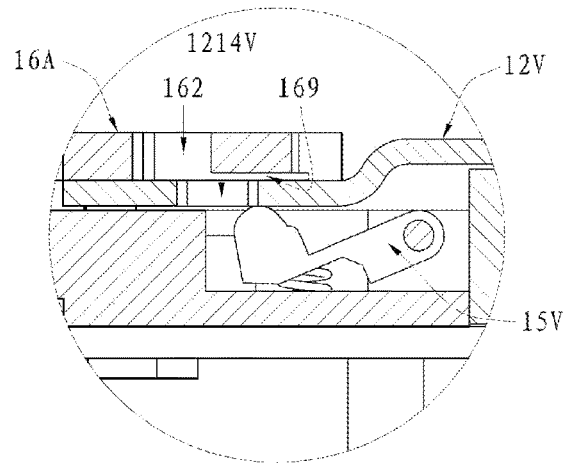
FIG. 27C is a cross-sectional view showing the interactions among the push/pull handle, the unlocking plate, and the rotation block piece when the unlocking plate along with the push/pull handle in FIG. 27B are in the process of retreating.

According to the above illustrated structures of this embodiment, it can be found that under the scheme of the vertical-superimposed rotation block piece 15V, since the reset bulge and the detention bulge are superimposed as one, the unlocking plate 12V under this embodiment, as a principle, can not provide a full-journey reset passing to the reset section 152V of the rotation block piece 15V during the module unlocking and resetting. Therefore, under this embodiment, there exists the extra down-press to the rotation block piece 15V from the unlocking plate's own body and thereby induces extra needs and consumptions with regard to the lateral accommodation rooms of the module casing, as shown in FIG. 27C on the cross-sectional illustration of this extra down-press to the rotation block piece 15V by the own body of the unlocking plate 12V during its retreat process. The advantage of this vertical-superimposed scheme is compactness, simple force structure on the rotation pin 101V, thus capable of fine stability and strength reliability.

Apart from the above all, the nature of working in the up-and-down fluctuating motion as realized by rotating around a fixed axis in the form of a rotation block piece in the above embodiments of the invention, can be in effective equivalence to or substituted by such as direct displacing and its associated structures under certain applications. Hence any motion block piece in the general sense that can provide motions in the said nature of working is to fall within the claims of this invention.

The invention claimed is:
1. An unlocking structure for unlocking pluggable modules locked by mounting cages with cages' engagement springs, comprising:
   a casing;
   an unlocking plate set onto the casing to slide along the casing in the casing's longitudinal direction, wherein the unlocking plate can complete module unlocking once the unlocking plate slides to a designated position, the unlocking plate including:
  a detention edge; and
  a motion block piece set between the unlocking plate and the casing, wherein the motion block piece can move in a transverse direction in relation to the casing, or in a direction containing the transverse direction, the motion block piece including:
  a detention bulge;
  wherein when the unlocking plate slides to the designated position and completes module unlocking, the detention edge of the unlocking plate is locked by the detention bulge.

2. The unlocking structure as in claim 1, wherein the motion block piece includes a reset bulge, wherein the detention bulge moves in pace with the reset bulge once the reset bulge is under drive by a force.

3. The unlocking structure as in claim 2, further comprising:
  a push/pull handle that is rotatably connected to the unlocking plate through a rotation connection and can push and pull the unlocking plate to slide along the casing in the casing's longitudinal direction, the push/pull handle including:
    a resetting edge, wherein when the push/pull handle drives the unlocking plate to the designated position to carry out module unlocking, the resetting edge gets close to the reset bulge of the motion block piece;
  wherein the reset bulge includes a slop surface such that when the resetting edge gets close to the reset bulge, and the push/pull handle is rotated, the resetting edge can slide upon the slop surface and drive back the motion block piece toward the inner side of the casing, so that the detention bulge is separated away from the detention edge of the unlocking plate.

4. The unlocking structure as in claim 3, wherein:
  the detention bulge and the reset bulge belong to different lateral heights of a same bulge, wherein the detention bulge becomes the detention section and the reset bulge becomes the reset section, the detention section being closer to the casing as compared to the reset section; and
  a detention-yield recess is set in conjunction with the resetting edge on the push/pull handle, wherein the detention-yield recess corresponds to and cooperates with the detention section, and the resetting edge corresponds to and cooperates with the reset section.

5. The unlocking structure as in any of claims 1-4, in which the motion block piece is a rotation block piece, wherein the rotation block piece is rotatably connected to the casing through a fix for rotation in such a way that the rotation block piece fluctuates up and down the casing surface when the rotation block piece rotates about the fix.

6. The unlocking structure as in claim 2 or 3, in which the motion block piece is a rotation block piece, wherein the rotation block piece is rotatably connected to the casing through a fix for rotation in such a way that the rotation block piece fluctuates up and down the casing surface when the rotation block piece rotates about the fix, wherein the detention bulge and the reset bulge are separated along the rotation's axial direction.

7. The unlocking structure as in claim 3, wherein the unlocking plate includes a semi-closed rotation yield hole and the push/pull handle includes a limiting rod, wherein the limiting rod can slide within the semi-closed rotation yield hole and when the limiting rod is at the innermost position of the semi-closed rotation yield hole, the push/pull handle is at the longitudinal horizontal status.

8. The unlocking structure as in claim 7, wherein a first limiting bump is set at the joint position where the border of the semi-closed rotation yield hole meets the profile edge of the unlocking plate such that when the push/pull handle rotates and the limiting rod passes over the first limiting bump, the limiting rod can be limited by the first limiting bump so that the push/pull handle can be kept at this position.

9. The unlocking structure as in claim 7, wherein a second limiting bump is set on the casing such that the second limiting bump can adjoin the limiting rod when the limiting rod is positioned at the innermost of the semi-closed rotation yield hole, where the second limiting bump can limit an unintentional jumping or jittering of the limiting rod.

10. The unlocking structure as in claim 2 or 3, in which the unlocking plate includes a reset-pass opening, wherein when the unlocking plate slides to the designated position and completes module unlocking, the reset bulge can pass through the reset-pass opening of the unlocking plate.

11. The unlocking structure as in claim 10, wherein the longitudinal length of the reset-pass opening matches the longitudinal sliding distance of the unlocking plate such that the reset bulge can always pass through the reset-pass opening during the unlocking plate's sliding along the casing's longitudinal direction to the designated position.

12. The unlocking structure as in claim 11, wherein the unlocking plate includes an auxiliary control opening in parallel with the reset-pass opening and the motion block piece includes an auxiliary control bulge, wherein only when the unlocking plate slides, along the casing's longitudinal direction, to the designated position and completes module unlocking, can the auxiliary control bulge pass through the auxiliary control opening of the unlocking plate.

13. The unlocking structure as in any of claims 1-3, further comprising:
  a motion block spring that is set between the motion block piece and the casing, where the motion block spring is normally under compressed status.

14. The unlocking structure as in any of claims 1-3, further comprising:
  a return spring set between the unlocking plate and the casing along the longitudinal orientation;
  wherein:
    the unlocking plate includes:
    a bent structure; and
    the casing includes:
    a first combined recess along the casing's longitudinal direction, wherein a horizontal longitudinal accommodation recess to receive both the bent structure and the return spring is set within the first combined recess, wherein one end of the return spring is to contact with the bent structure, the other to butt against one longitudinal end of the horizontal longitudinal accommodation recess, and
    the other longitudinal end of the horizontal longitudinal accommodation recess is a defined stop limit to butt against the bent structure of the unlocking plate in order to decide the ultimate position of the unlocking plate when the unlocking plate returns from the designated position along the casing's longitudinal direction.

15. The unlocking structure as in claim 14, wherein:
  the first combined recess includes a vertical mounting groove for a passing of the bent structure of the unlocking plate, wherein one end of the vertical mounting groove is open, the other connects to the horizontal longitudinal accommodation recess; and the unlocking plate includes a return spring mounting opening by a side of the bent structure along the longitudinal direction, wherein the return spring mounting opening corresponds to the position of the horizontal longitudinal accommodation recess in order to mount the return spring.

16. The unlocking structure as in claim 14, wherein:

a locking step surface is set at the rear end of the first combined recess, wherein the locking step surface is to work with the cage engagement spring and is the designated position; and the unlocking plate includes an unlocking arm in the longitudinal direction, wherein the unlocking arm can slide backward along the longitudinal direction in the first combined recess, wherein the unlocking arm includes an unlocking edge at the rear end of the unlocking arm so that the unlocking edge is to get contact with the locking step surface thus to carry out module unlocking.

17. The unlocking structure as in claim 16, wherein:

an upper step surface and a lower step surface with coplanarity are set in the first combined recess along the upper and lower edge regions of the unlocking arm in the longitudinal length direction; and a slope surface is set close to the locking step surface in the first combined recess.

18. A method of unlocking pluggable modules locked by mounting cages, comprising:

setting an unlocking plate onto a casing of a module such that the unlocking plate can slide along the casing in the casing's longitudinal direction, wherein the unlocking plate includes a detention edge;

preparing a motion block piece with a detention bulge and setting the motion block piece between the unlocking plate and the casing such that when the unlocking plate slides backward along the casing in the casing's longitudinal direction and arrives at a designated position, the motion block piece will move protrudingly toward the outer side of the casing and have the detention edge of the unlocking plate locked by the detention bulge;

driving the unlocking plate to slide backward along the casing in the casing's longitudinal direction to the designated position to get the module unlocked; and dragging the unlocking plate back forward to remove the module.

19. The method of unlocking pluggable modules as in claim 18, further comprising:

adding a reset bulge to the motion block piece, wherein the reset bulge includes a slop surface;

preparing a push/pull handle such that the push/pull handle is connected to and can rotate in relation to the unlocking plate, wherein the push/pull handle includes a resetting edge such that when the unlocking plate gets the module unlocked the resetting edge is close to the reset bulge; and rotating the push/pull handle so that the resetting edge slides upon the slop surface of the reset bulge and drives back the motion block piece toward the inner side of the casing, so that the detention bulge is separated away from the detention edge of the unlocking plate.

20. The method of unlocking pluggable modules as in claim 19, further comprising:

setting a return spring between the unlocking plate and the casing along the casing's longitudinal orientation such that when the detention bulge is separated away from the detention edge of the unlocking plate the return spring drives the unlocking plate back forward and resets the module.

\* \* \* \* \*